(12) United States Patent
Greenwood et al.

(10) Patent No.: US 6,456,336 B1
(45) Date of Patent: Sep. 24, 2002

(54) SIGNAL GENERATOR

(75) Inventors: Jonathan Mark Greenwood, Basingstoke; Andrew Garrett, Stroud, both of (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/545,719

(22) Filed: Apr. 7, 2000

(30) Foreign Application Priority Data

Apr. 9, 1999 (GB) ............................................. 9908234

(51) Int. Cl.$^7$ ................................................. H04N 9/74
(52) U.S. Cl. ........................................ 348/593; 348/594
(58) Field of Search ................................. 348/584, 585, 348/593, 594, 598; H04N 9/74, 9/76

(56) References Cited

U.S. PATENT DOCUMENTS 4,764,809 A * 8/1988 Haycock et al. ............ 348/594
5,608,465 A   3/1997 Lake ........................... 348/584

* cited by examiner

Primary Examiner—Sherrie Hsia
(74) Attorney, Agent, or Firm—Frommer Lawrence & Haug LLP; William S. Frommer

(57) ABSTRACT

A signal generator for use in a wipe generator comprises a first ramp generator which produces a video ramp signal R1 for each pixel of a predetermined set of pixels h where h=0 to n of each of a predetermined set of video lines v where v=0 to m, of a picture, wherein $$R1 = A1h + B1v + C1$$

where A1, B1, and C1 are coefficients each having a magnitude equal to or greater than zero, and a second ramp generator which produces a video ramp signal R2 for each pixel of a predetermined set of pixels h where h=0 to n of each of a predetermined set of video lines v where v=0 to m of the picture, wherein $$R2 = A2h + B2v + C2$$

where A2, B2, and C2 are coefficients each having a magnitude equal to or greater than zero. A2 and B2 are varied in accordance with the change in an angle of rotation, and the first and second ramps are combined by non-additively mixing.

22 Claims, 28 Drawing Sheets

 
Fig. 6A          Fig. 6B
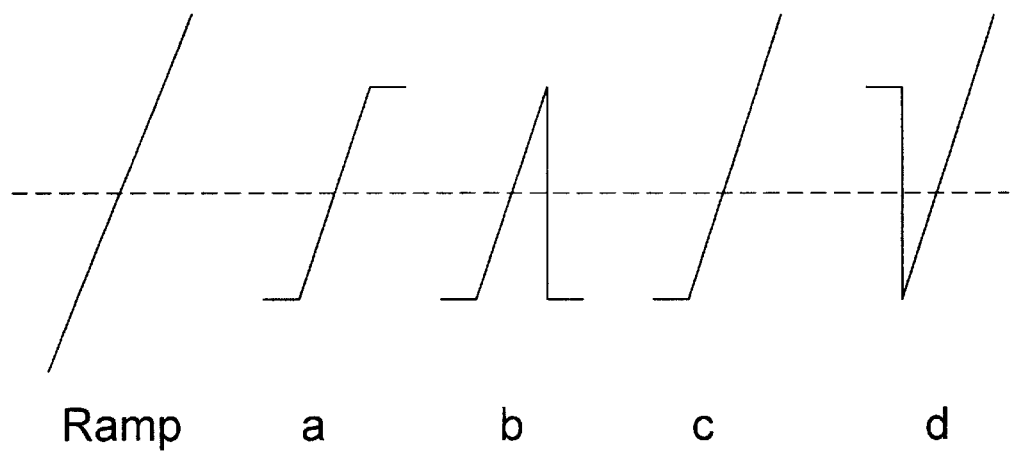
Fig. 7

0   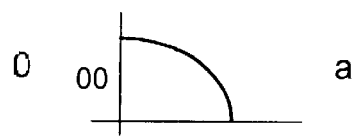   a
1   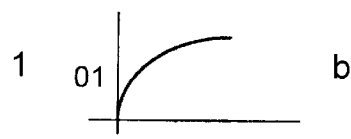   b
2   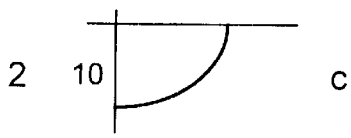   c
3   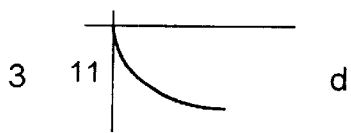   d
4   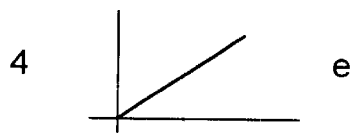   e
5   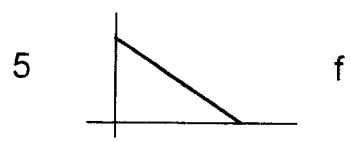   f
6   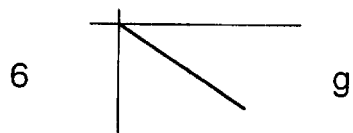   g
7   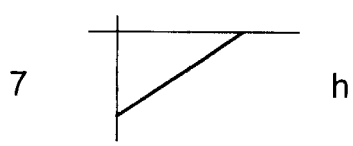   h
8   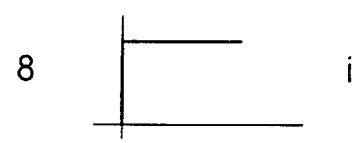   i
9   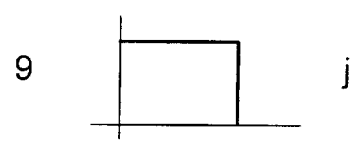   j
10   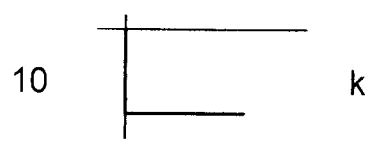   k
11   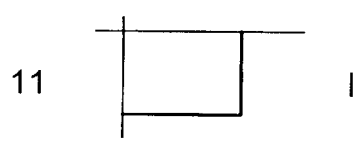   l
*Fig. 14*

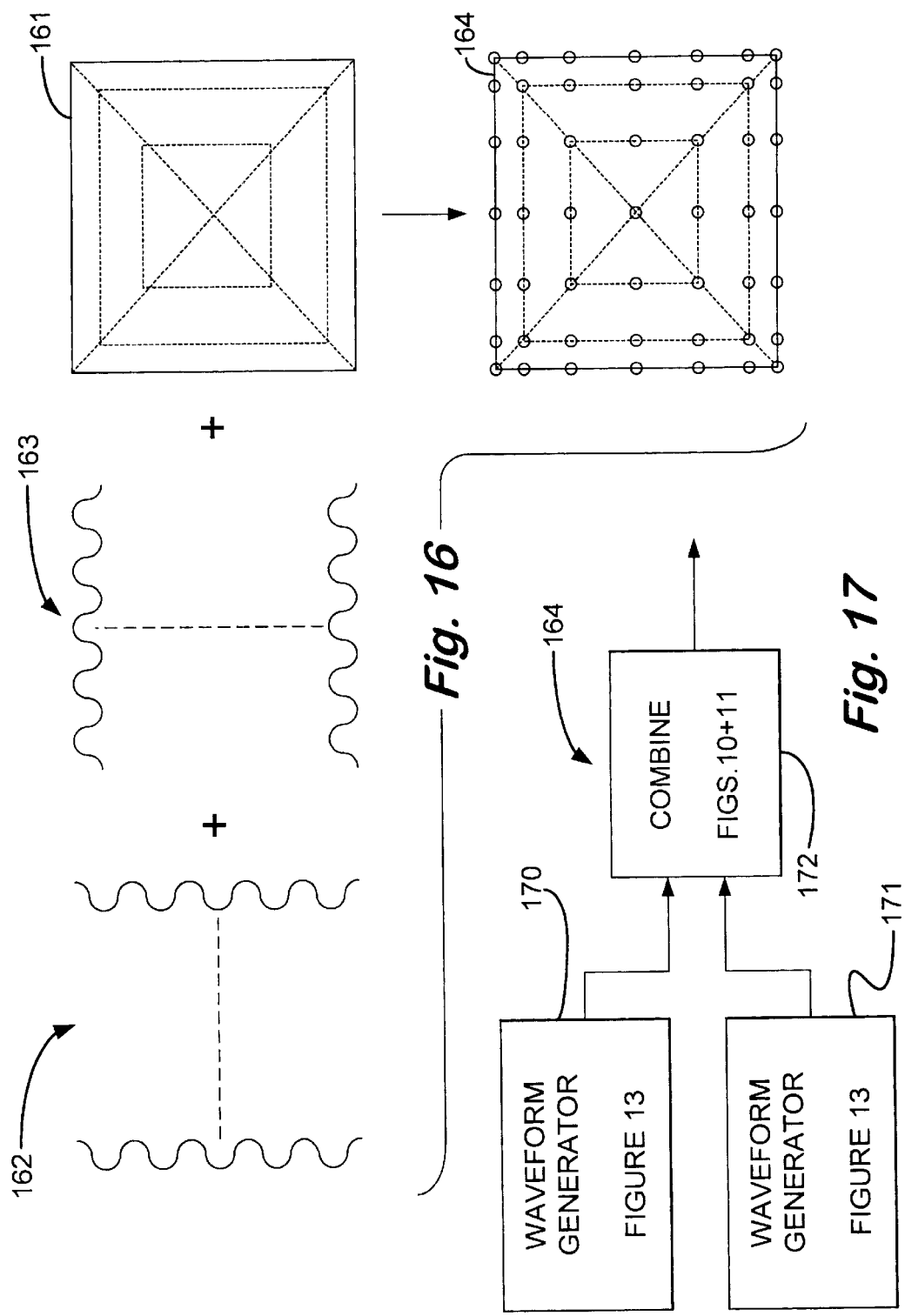

SIGNAL GENERATOR

BACKGROUND OF THE INVENTION

1. Field of the Invention

The present invention relates to a signal generator. Such a signal generator is preferably for generating a 'solid' used in a video wipe generator of a vision mixer.

A solid is an electrical signal representing a three dimensional surface of a desired shape. It comprises at least one ramp signal and typically comprises a combination of at least two ramp signals which themselves may be modified. It may also comprise a signal defined by a polar coordinate system representing a curved surface.

2. Description of the Prior Art

Reference will now be made to FIGS. 1 to 3 of the accompanying drawings which show background to the present invention.

FIG. 1 illustrates a known simple wipe between two video sources X and Y.

As the wipe proceeds as indicated by arrow W, video X is replaced across the display by video Y (or vice versa). The effect of a wipe is achieved by mixing the video sources X and Y according to $$KX+(1-K)Y$$

where K is a keying signal. The keying signal K is derived from a 'solid'. This will be explained with reference to FIGS. 2 and 3 i.e. a function having a value depending on the h and v co-ordinates within the picture, where v represents line number and h represents pixel position along a line.

FIG. 2a illustrates a known example of a 'solid' which is a simple ramp. As shown in FIG. 2, a clip level CP is defined. It will be appreciated that over a field or frame, the clip level defines a plane referred to herein as the clip plane, which will be described in more detail with reference to FIG. 4 below. The keying signal K is, in known manner, derived from the solid by applying high gain to the solid and limiting the result, as shown in FIG. 2B. The keying signal has two levels 0 and 1. The transition between the levels occurs where the solid intersects the clip plane CP. The position of intersection is varied, to produce the wipe, by adding an offset to the solid.

FIG. 3 is a schematic block diagram of a wipe generator of a vision mixer comprising a solid generator, a clip element, a gain element, a limiter and a mixer which mixes video sources X and Y in dependence upon the keying signal K.

The solid generator produces a solid, for example a ramp as shown in FIG. 2A. The clip element applies an offset to the ramp to vary the intersection of the ramp with the clip plane CP as shown in FIGS. 2A to 2C. Gain is applied to the offset ramp, in the gain element and the result limited in the limiter to produce the signal K. The amount of gain applied may be varied as shown in FIG. 2B: that varies the slope of the transition between the limit values of the keying signal K.

The mixer mixes the video sources X and Y according to $$KX+(1-K)Y.$$

This is K=1, the output is X, if K=0 the output is Y.

If the gain applied to the solid is unity and the clip offset is zero, the solid and the keying signal are identical A known wipe pattern is a clock wipe which is so-called because it proceeds as a rotation of a line.

SUMMARY OF THE INVENTION

According to one aspect of the present invention, there is provided a signal generator comprising a first ramp generator which produces a video ramp signal R1 for each pixel of a predetermined set of pixels h where h=0 to n of each of a predetermined set of video lines v where v=0 to m, of a picture, wherein $$R1=A1h+B1v+C1$$

where A1, B1, and C1 are coefficients, a second ramp generator which produces a video ramp signal R2 for each pixel of a predetermined set of pixels h where h=0 to n of each of a predetermined set of video lines v where v=0 to m of the picture, wherein $$R2=A2h+B2v+C2$$

where A2, B2, and C2 are coefficients, means defining the an angle of rotation, means for varying A2 and B2 in accordance with the change in the angle of rotation, and ramp combining means including NAM means for non-additively mixing the first and second ramps.

Such a signal generator produces a rotating wipe pattern simply by varying the coefficients of one (or both) of the ramps and NAMing the ramps together. The two ramps may rotate simultaneously or one of them may be fixed. Two ramps may rotate in opposite directions simultaneously.

Several rotating wipe patterns can be produced simultaneously by providing more ramp generators and suitably NAMing the ramps. For some patterns the ramps to be NAMed may be selected in dependence upon position in the picture, and the selection may be made according to the quadrants of the picture occupied by the combined ramps. Preferably the ramps are controlled to rotate in portions, e.g. quadrants, of the frame to avoid the need for selection.

For some patterns it is necessary to invert the sense (positive or negative) of the NAM function in dependence upon angle of rotation.

According to another aspect of the invention, there is provided a signal generator comprising a plurality n of ramp generators which produces video ramp signals Rn for each pixel of a predetermined set of pixels h where h=0 to n of each of a predetermined set of video lines v where v=0 to m, of a picture, wherein $$Rn=Anh+Bnv+Cn$$

where An, Bn, and Cn are coefficients, means defining the an angle of rotation, means for varying at least some of the coefficients An and Bn in accordance with the change in the angle of rotation, and ramp combining means including means for non-additively mixing ramps and means for selecting ramps and/or selecting combined ramps.

In an embodiment of the another aspect the combining means comprises a plurality of combining stages each having first and second inputs for receiving first and second ramps and an output, each stage including Non-Additive Mixing (NAM) means for mixing the ramps and selecting means for selectively coupling the output to the first and second inputs.

In an embodiment of the another aspect each NAM means implements a positive NAM function and a negative NAM function, and comprising means for selecting the positive or negative NAM function for the NAM means.

In an embodiment of the another aspect the NAM function is selected in accordance with the angle of rotation.

An embodiment of the another aspect comprises means for controlling the said selecting means to selectively couple the output of a said selecting means to its first and second inputs in dependence upon the positions in the picture of the ramps at its first and second inputs, and means for indicating the positions of the ramps in the picture.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 6 illustrates negating a ramp coefficient;

FIG. 7 illustrates examples of limiting the value of the ramp signal;

FIG. 14 is a diagram showing edge modulation patterns;

FIG. 16 is a simplified illustration of an example of solid modulation;

FIG. 17 is a schematic block diagram of a circuit for producing a solid modulation waveform;

DESCRIPTION OF THE PREFERRED EMBODIMENTS

Figure 5:
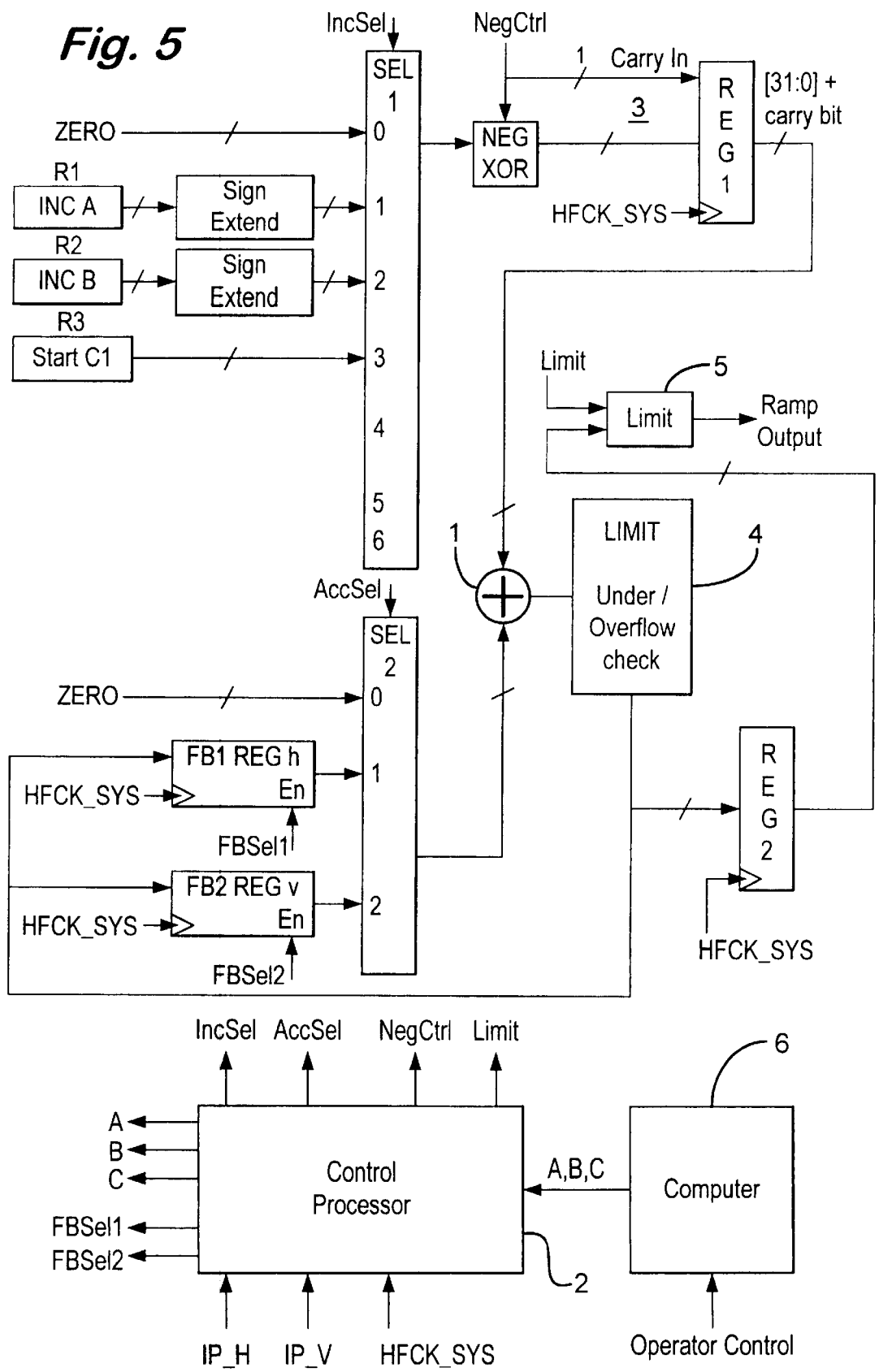
FIG. 5 is a block schematic diagram of an illustrative ramp generator.

The ramp generator of FIG. 5 produces a solid according to the equation $$R = Ah + Bv + C$$

where A, B, and C are selectable coefficients, v is line number and h is pixel position along a line. The equation defines a three dimensional ramp R in three dimensional space as shown by way of example in FIG. 4. The ramp value R is calculated from A, B and C individually for each pixel h on each line v. The values are represented by signed numbers, preferably twos complement numbers. As will be explained in more detail hereinafter, the value of h ranges from 0 to n and the value of v ranges from 0 to m.

The lines v of a field or frame over which the ramp is produced are selectable and the pixels h within those lines are also selectable provided the lines v are a contiguous set of lines and the pixels h are a contiguous set of pixels. The ramp may be generated in a field or in a frame. For ease of explanation the following description is based on the assumption that a progressively scanned frame is used.

The ramp values R can range from a negative maximum value −M through zero to a positive maximum value +M. The dynamic range DR of a ramp is such that the ramp may effectively be much larger in area than the area of an active frame of a video.

Figure 4:
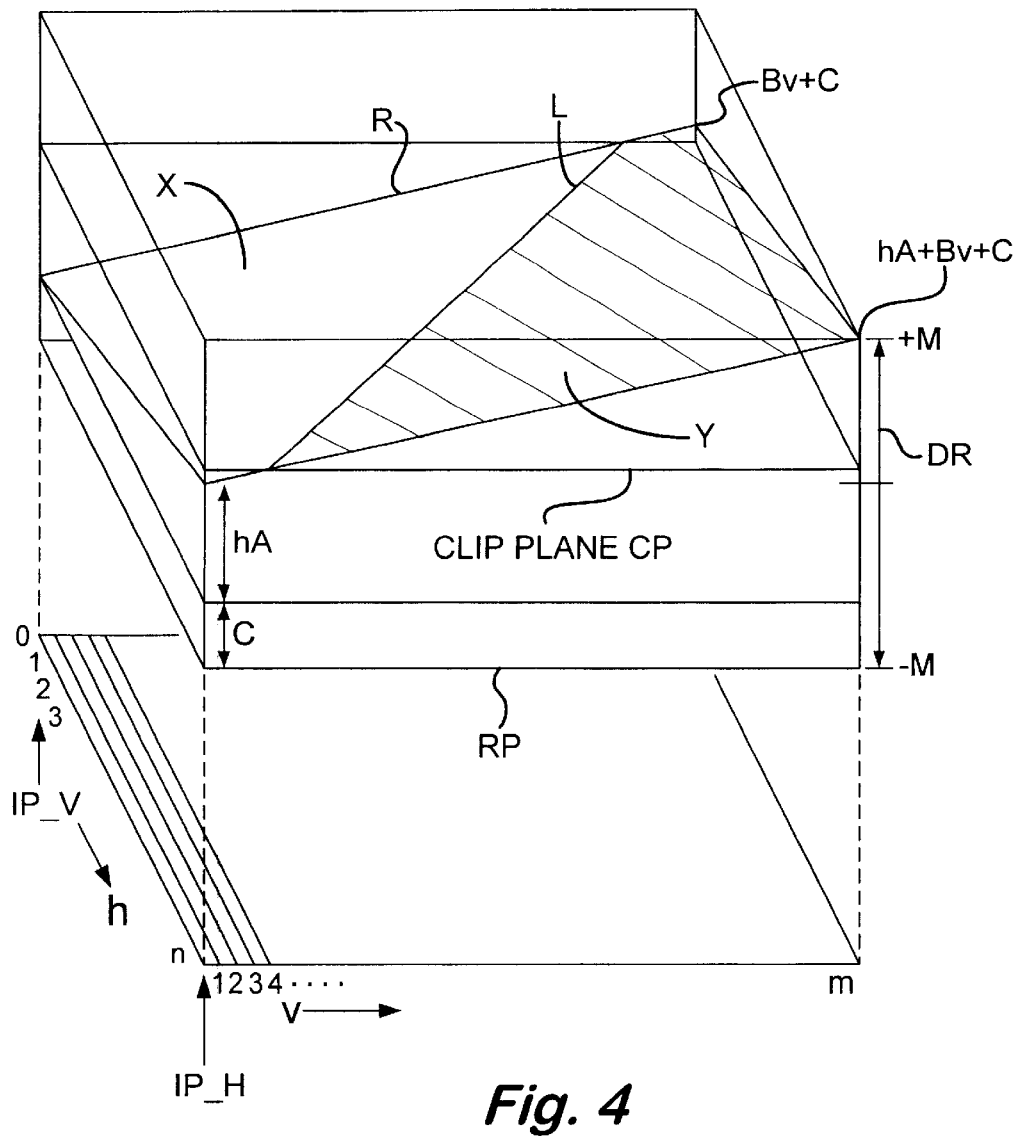
FIG. 4 is a diagram illustrating a solid together with a clip level.

Referring to FIG. 4 lines v of a whole progressively scanned TV frame are shown numbered 0, 1, 2 . . . m. Pixel positions h of whole lines are shown as 0 to m. An illustrative ramp R is shown which is offset from a reference plane RP at −M by C.

Figure 1:
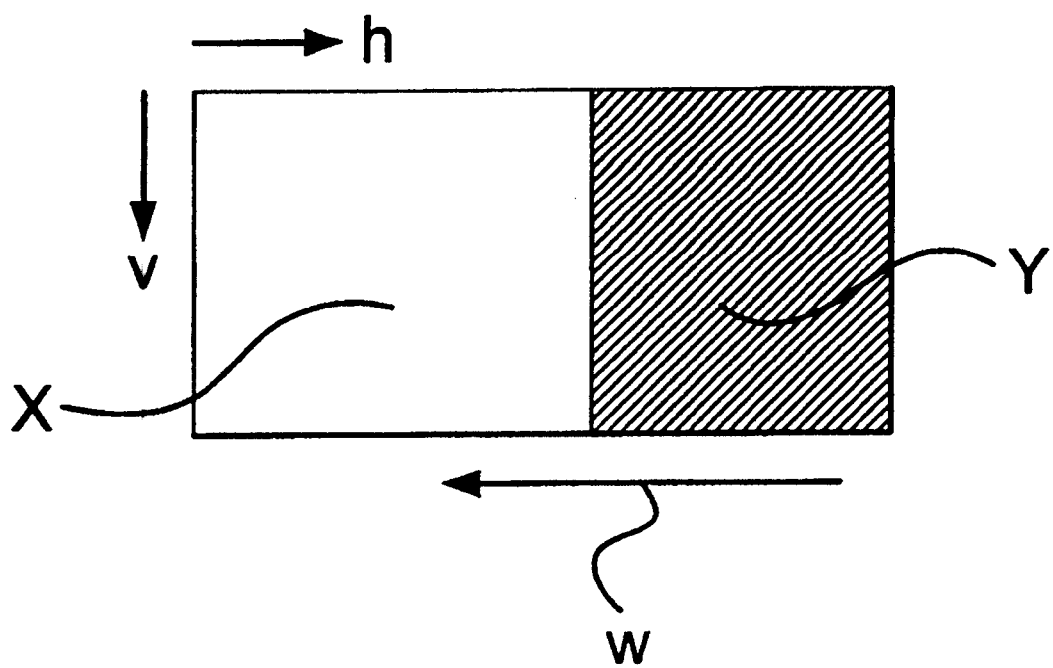
FIG. 1 illustrates a wipe.
Figure 2:
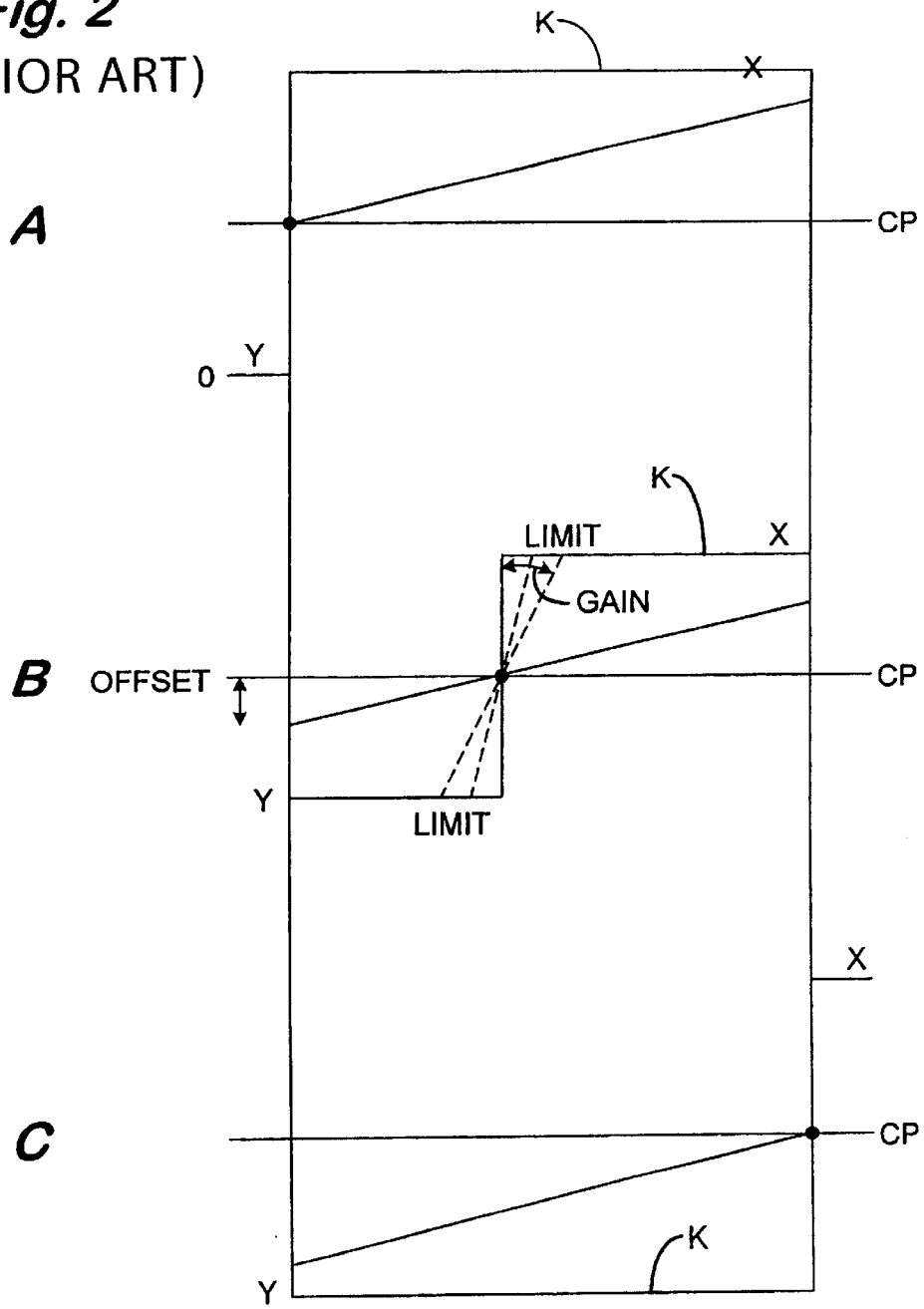
FIG. 2 illustrates a solid together with a keying signal.
Figure 3:
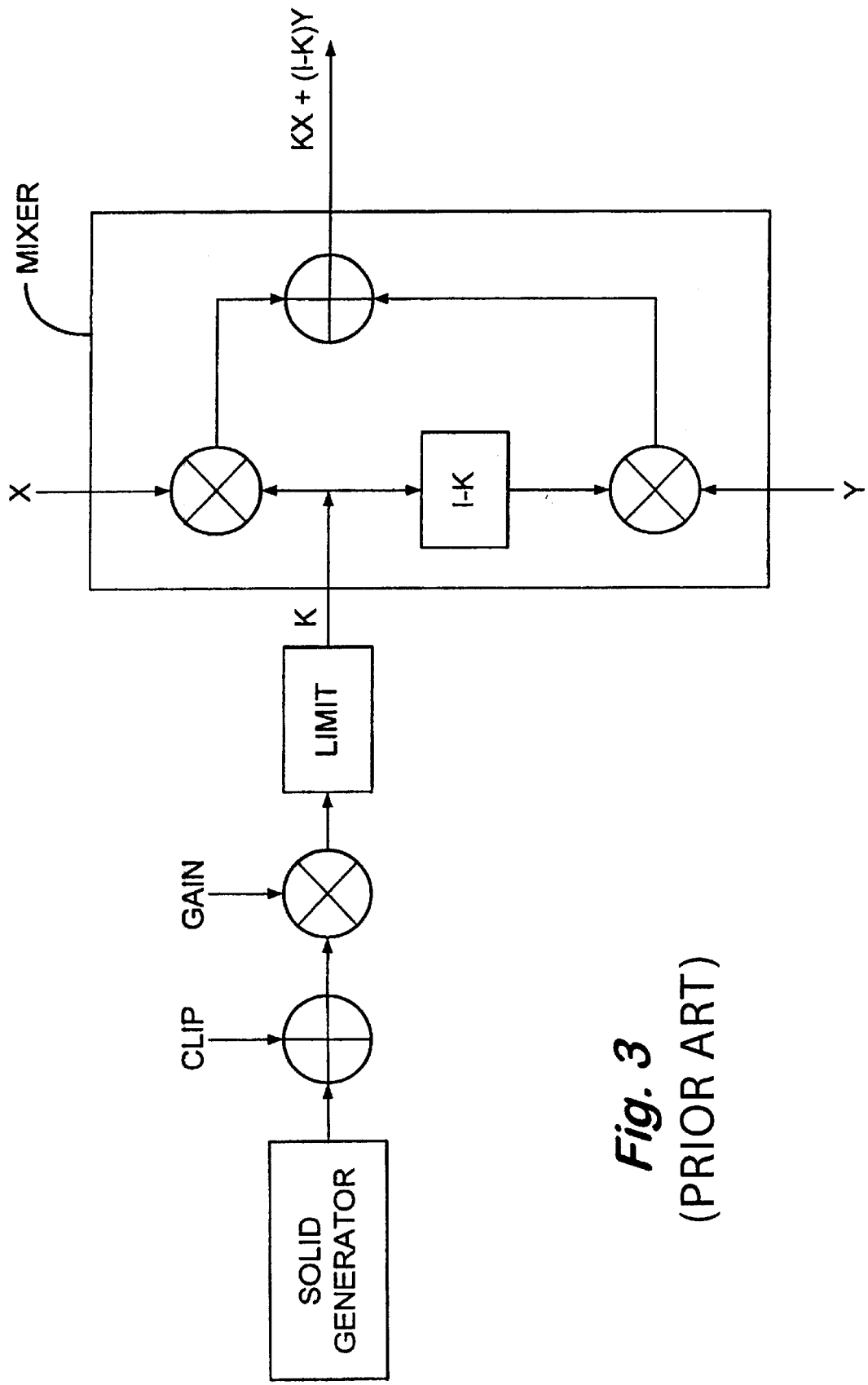
FIG. 3 is a schematic block diagram of a known wipe generator.

By way of initial and simplified explanation a clip plane represented by plane CP is shown in FIG. 4 intersecting the ramp R along a line L. The position at which the ramp intersects the clip plane CP is defined by the offset C. On line v=0 the ramp has slope A. For pixel h=0 on lines v, the ramp has slope B. The transition region of the keying signal K occurs along the line L. Where K exceeds the clip plane CP video from one source Y forms part of a displayed image and where K is equal to or less than the clip plane video from another source X forms the other part of the displayed image, as described above with reference to FIGS. 1 and 3.

The solid generator of FIG. 5 comprises registers R1(INC A), R2 (INC B) and R3 (Start C) for storing preselected values of the coefficients A, B and C. The registers R1, R2 and R3 are coupled to an increment selector SEL1 which selectively couples the registers R1 to 3 to an adder 1 via a register REG1 which is clocked by a pixel rate clock signal HFCK_SYS. Feedback registers FB1 and FB2 are coupled to another, feedback selector SEL2 which selectively connects the feedback registers FB1 and 2 and an input of ZERO to the adder 1. The output of the adder is connected to an output register REG2 also clocked by the pixel clock HFCK_SYS. The registers R1 to 3 and FB1 and FB2 and the selectors SEL1 and 2 are controlled by a real-time controller which receives line pulses IP_H and frame pulses IP_V and the clock HFCK_SYS and produces IncSel and AccSel signals for controlling the selectors SEL 1 and 2. The controller also controls the loading of the coefficients A, B and C into the registers R1 to R3.

A computer 6 generates the coefficients A, B and C and control data for each frame, in advance of the frame, and provides the coefficients and the control data to the real-time controller 2. The controller 2 feeds the coefficients to the registers R1, R2, R3. The computer 6 acts as an interface between operator controls and the controller 2. It generates the coefficients A, B and C in accordance with the setting of the controls by the operator.

The generator operates as follows with reference to FIG. 4. The basic principle is that the adder 1 adds an increment from one of the registers R1 to R3 to an accumulated value stored in one of the registers FB1 and FB2 and feeds the sum back to one of the registers FB1, FB2 for addition to another increment.

Referring to FIG. 4, assume for ease of description that a ramp R is to start at pixel h=0 of line v=0 with an offset C and coefficients A and B. Assume A, B and C are loaded into the registers R1 to R3 once per frame. The controller, on receiving a frame start pulse IP_V indicating the start of the active lines of a frame, causes selector SEL1 to select the value C in register R3 and feed it to the adder 1 via the register REG1 on a first HFCK_SYS pulse. At the same time, the selector SEL2 selects the value ZERO and feeds it to the adder 1. The sum C+0 is fedback to the registers FB1 and FB2 and stored in both of those registers. The sum is also fed to the output register REG2 for outputting on the next HFCK_SYS pulse coefficient (A) is selected from register R1 by selector SEL1, and FB1 is selected from by selector SEL2. Register FB1 now accumulates successive increments of C+hA along line v=0 for h=0 to n. At the end of the line the store FB1 contains C+nA. Pulse IP_H, indicating the beginning of a new line, occurs and increment B is selected from register R2 by selector SEL1, and selector SEL2 selects the content C of register FB2. Coefficient B from register R2 and C from FB2 are added in adder 1 to produce a new sum B+C which is fed back to both registers FB1 and FB2. Thus both contain the ramp value B+C for the beginning of line v=1 at position h=0. The selector SEL2 selects register FB1 which now accumulates C+B+hA for h=0 to n along line v=1 until the end of the line when the next IP_H pulse occurs. At the end of line v=1 the register FB1 contains C+B+nA. The selectors again select coefficient B in register R2 and register FB2 to increment the contents of FB1 and FB2 to C+2B at the beginning of line v=2. Register FB1 then accumulates by A along line v=2 until pulse IP_H occurs and registers FB1 and 2 are again incremented by coefficient B. The process repeats line by line until the next pulse IP_V occurs indicating the end of the frame and the beginning of the next frame. The whole process repeats for each frame.

It will be appreciated that the ramp is built up pixel by pixel in synchronism with the clock signals HFCK_SYS.

The foregoing description assumes that the ramp occupies a whole frame. A ramp may occupy only a part of a frame as will be described with reference to FIGS. 29 to 39, for example.

Inverted Ramps

The foregoing description describes ramps in which the value R of the ramp is successively incremented i.e. increased for each addition of a coefficient A or B. The generator of FIG. 5 allows a ramp value to be successively decremented to produce an inverted ramp. This is done using a negate circuit 3, comprising an EXOR circuit and the register REG1, and which negates the increments held in the registers R1 to R3 after selection by the selector SEL1. The increments are in 2s complement form. Negating a 2s complement number is done by inverting the bits of the number and adding one. The EXOR circuit inverts the bits of the selected increment in response to a negate control bit negCtrl and the negate control bit is fed into the register REG1 as a carry bit to add one. Thus as shown in FIG. 6A for a one dimension of a ramp 60, a positive ramp 60 is produced in the manner described above upto a desired maximum level and then as shown in FIG. 6B it is successively decremented using the negated increments. The operation of the ramp generator is otherwise unchanged. The negate control bit neg Ctrl is provided by the controller. It is possible to produce an inverted ramp over a frame by negating the coefficient A and/or B.

Limiting Ramps.

In order to prevent over or under flow, a limiter 4 is provided in the feedback path from the adder to the feedback registers FB1 and FB2. Another limiter 5 is provided at the output of the generator. Referring to FIG. 7 this output limiter 5 may limit a positive extreme ramp value to a positive limit or a negative limit as shown in FIGS. 7a and 7b or limit a negative extreme value to either a negative or a positive limit as shown in FIGS. 7c and d. The limiter is controlled by the controller to select the desired limiting property.

Effects of Varying A, B and C

Increment A defines the slope of the ramp in the line direction. Increment B defines the slope of the ramp in the frame direction, perpendicular to the line direction. A and B together can have the effect of rotating the ramp in space if they are scaled differently. C offsets the ramp in a direction perpendicular to the line and frame directions. C has the effect of shifting the intersection of the ramp with the clip plane. By varying C the position of a ramp can be moved in a frame.

Example of a Solid Generation System Combining Ramps

Figure 8A:
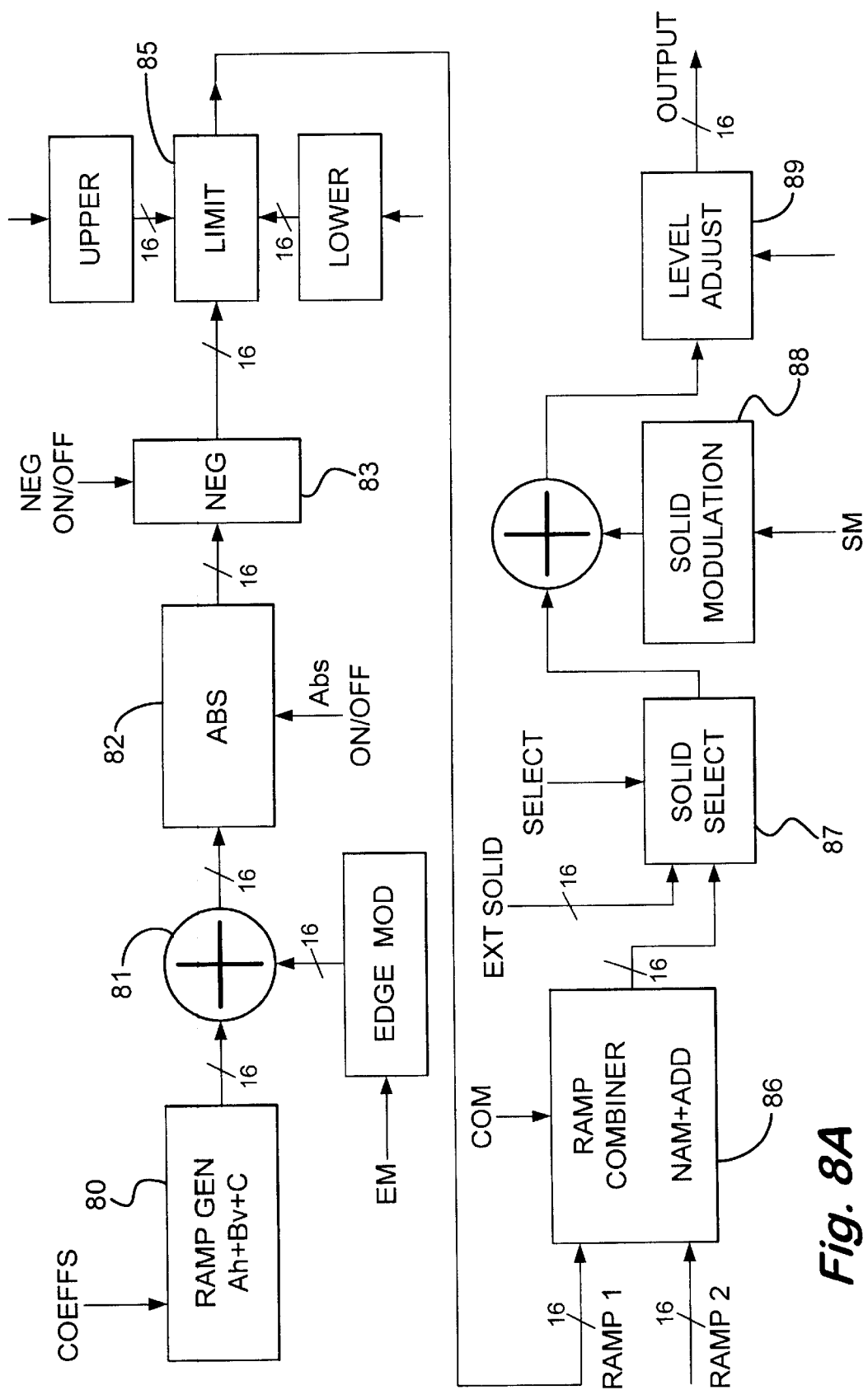
FIG. 8 is a block diagram of a solid generator system.
Figure 8B:
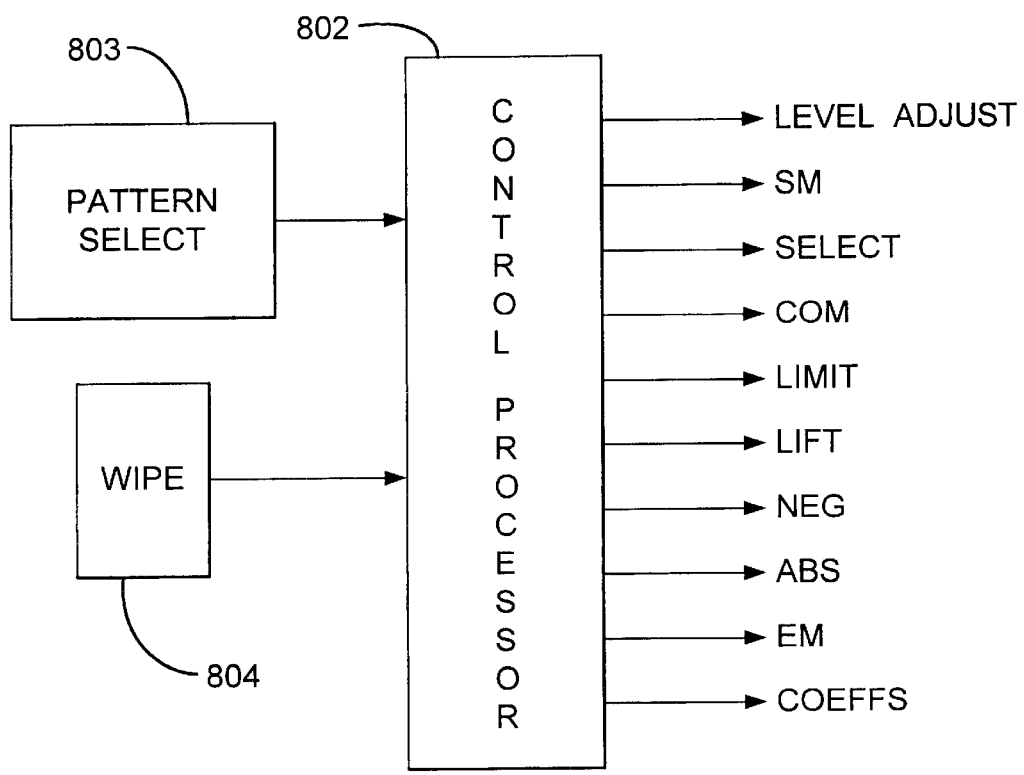

Referring to FIG. 8, there is shown a simplified block diagram of a solid generation system. The generation system comprises a plurality of ramp generators 80 as described for example with reference to FIGS. 5 to 7. The system of FIG. 8 has only two, ramp generator (and only one is shown) but there may be many more, for example 8 ramp generators. The ramps are combined in a combiner 86. In the combiner, the ramps are combined in a manner defined by control signals.

Each ramp generator produces a ramp which may be 'edge modulated' 81 as described with reference to FIGS. 12 to 15. The ramp may also be subject to absoluting, negating, offsetting and limiting as indicated by blocks 82 to 85. A "box solid" produced by combining two absolute ramps will be described with reference to FIGS. 9, 10 and 11. Ramps may be combined in the combiner 86 as will be described with reference to FIG. 10. The level and scale of the solids relative to the clip plane may be adjusted by an adjuster 89. A solid selector 87 selects the sold from the combiner 86 or a solid generated externally. The selected solid may be combined with a modulated solid produced by a solid modulation block 88. Solid modulation is described in more detail below.

It will be appreciated that the system of FIG. 8 is illustrative only. The techniques of ramp generator, edge modulation and solid modulation, may be used in other solid generator systems as will also be described hereinbelow.

The system is controlled by a controller 802. The controller 802 stores and implements algorithms which define wipe patterns which are selected by a control panel 803. The controller 802 also includes a wipe control 804 which is an operator-initiated control.

Figures 9A, 9B, 9C:
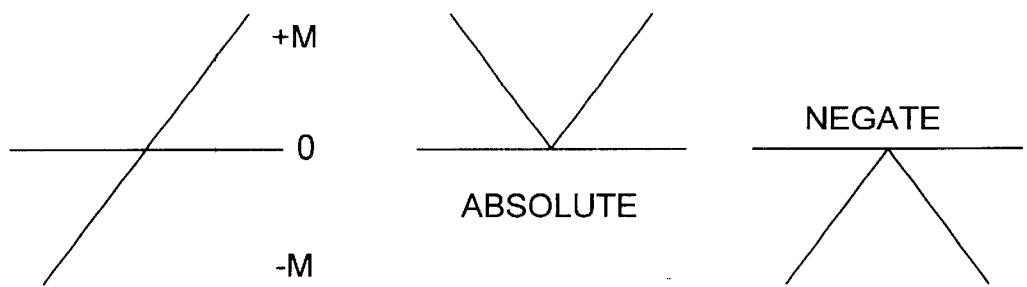
FIGS. 9A to E are diagrams illustrating absoluting, negating, lift and combining operations.
Figure 9D:
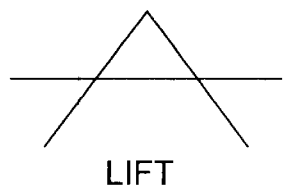

FIG. 9A shows a single ramp which has a dynamic range of −M through to zero to +M. The ramp is represented by (signed) twos complement numbers. An absolute function (82), in known manner, transforms all the numbers representing the ramp to positive numbers, thus producing a ramp as shown in FIG. 9B. The ramp of FIG. 9B may be negated 83 as shown in FIG. 9C, i.e. it is represented by negative numbers. The absolute ramp may be subject to an offset 84 by adding a fixed value to the ramp. FIG. 9D shows the negated, absolute ramp of FIG. 9C with an offset. The ramp of FIG. 9B may be offset in similar manner.

Figure 9E:
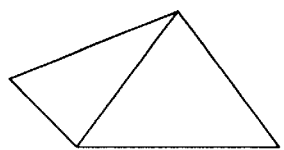

In general a ramp may be modified by any one or more of absoluting, negating and offsetting. FIG. 9E shows, as an example of a solid, a "square" solid, which is a rectangular pyramid formed by combining two ramps shown in FIG. 9D, one ramp being at right angles to the other.

Figure 10:
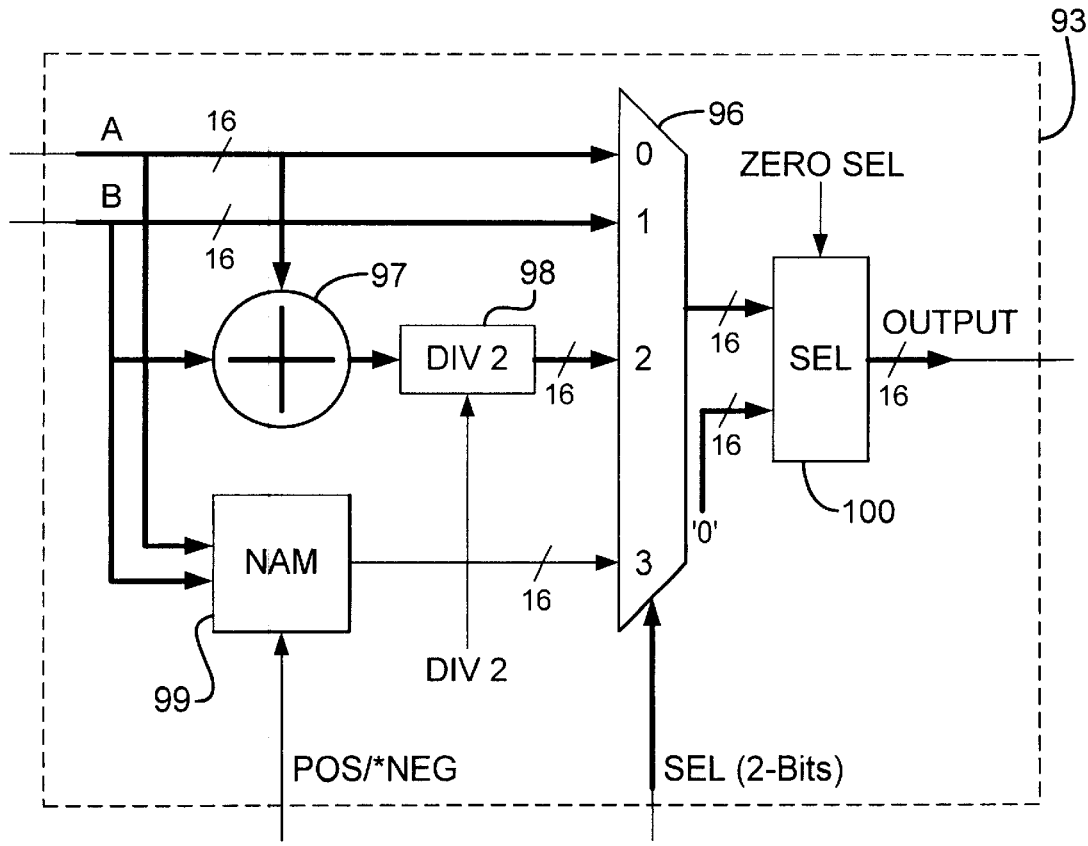
FIG. 10 is a block diagram of a ramp combiner.

An example of a preferred combiner is shown in FIG. 10. Two ramps A and B (which may be modified by the processing circuits 81 to 85) are fed to a selector 96 having inputs 0 to 3. Input 0 receives ramp A. Input 1 receives ramp B. Input 2 receives a first combination of the ramps from a first combining circuit 97 and a divide-by-2 circuit 98. Input 3 receives a second combination of the ramps from a second combining circuit 99. The one of the inputs 0 to 3 to be coupled to the output of the selector is selected by a two bit selection signal SEL. The output of the selector 96 is coupled to the output of the combiner 93 via another selector 100 which selects the output of the selector 96 or zero according to a zero select signal. If the select signal SEL is 0 or 1, ramp A or B is passed to the output unmodified. The combiner 93 then acts as a switch or signal router.

The first ramp combining circuit comprises an adder 97 and a divide by two circuit 98. The divide by two circuit has a control input for receiving a divide-by-2 control signal. The divide-by-2 control signal selectively actuates the divide-by-2 circuit 98. Thus input 2 of the selector 96 receives either (A+B) or (A+B)/2.

Figure 11:
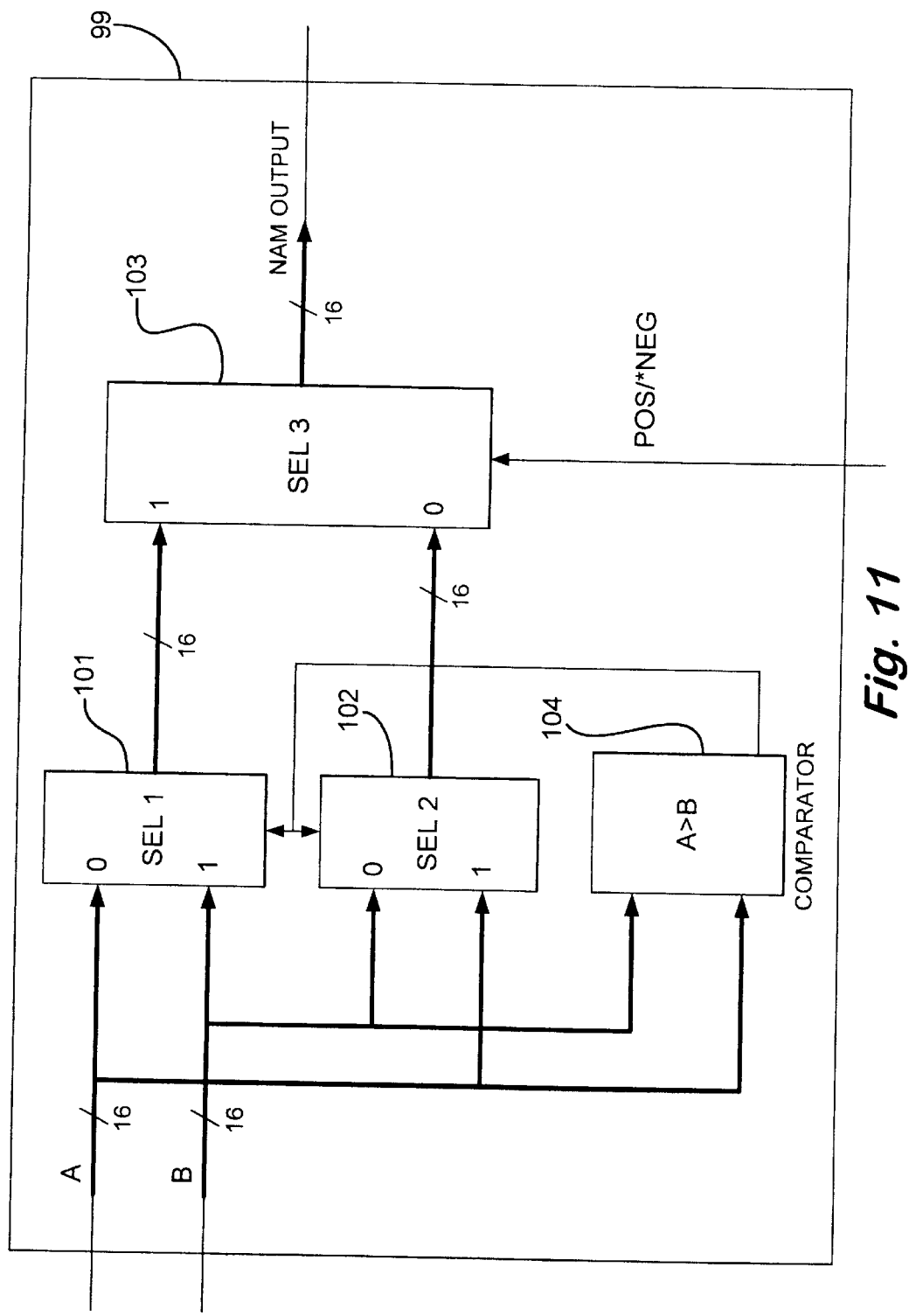
FIG. 11 is a block diagram of a non-additive mixer of the combiner of FIG. 10.

The second ramp combining circuit 99 is a Non-Additive Mixer also known as a NAM an example of which is shown in FIG. 11. Referring to FIG. 11, the NAM comprises first second and third selectors 101 102 and 103 and a comparator 104. The comparator compares the instantaneous values of the ramps A and B. If A>B then it outputs logic 0 otherwise it outputs logic 1. The first and second selectors select input 0 or 1 according to the output of the comparator. The third selector selects the first or second selector according to the value of a POS/NEG signal. The overall truth table of the NAM is:

| COMPARISON OF RAMPS | POS/NEG | OUTPUT OF NAM |
|---|---|---|
| A > B | POS | A |
| B > A | POS | B |
| A > B | NEG | B |
| B > A | NEG | A |

For POS/NEG POS, the NAM outputs whichever of A and B is greater at any moment in time, i.e. at any pixel position. For POS/NEG NEG the NAM outputs whichever of A and B is smaller.

Overall, the combiner 93 selects one of the ramps A and B, an additive combination of the ramps, a non-additive combination of the ramps or zero.

Box Solid

A 'box solid' is a well known solid. Referring to FIGS. 9, 10 and 11, it may be produced by absoluting two ramps at right angles to each other and combining them using a negative NAM function. The result is a square pyramid as shown in FIG. 9E. Another solid may be produced using a positive NAM function. Other solids can be produced using the add function.

Edge Modulation

Figure 15A:
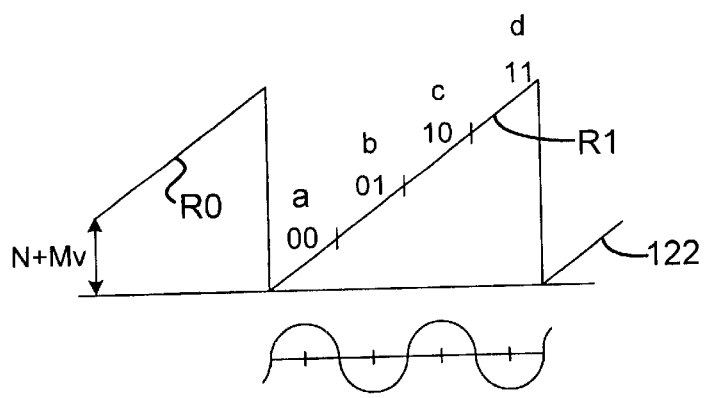
FIGS. 15A to E illustrate the operation of the edge modulator.
Figure 15B:
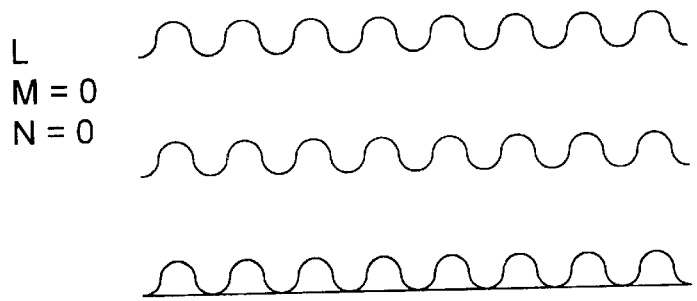
Figure 15C:
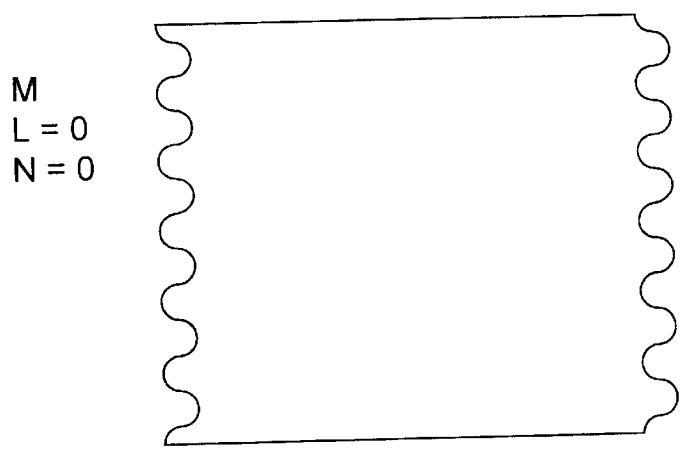
Figure 15D:
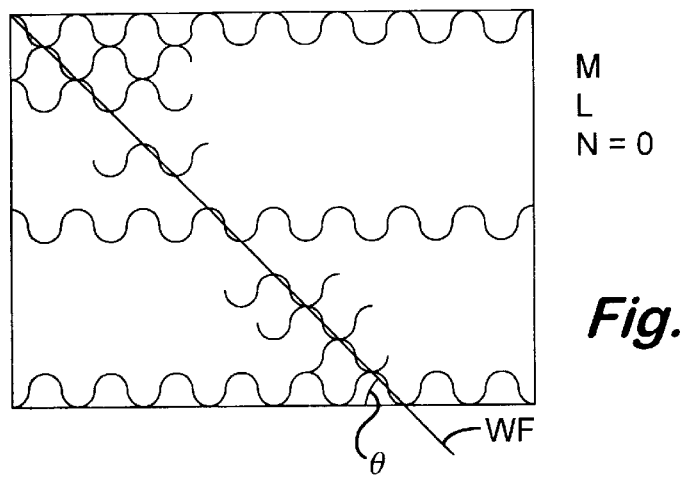
Figure 15E:
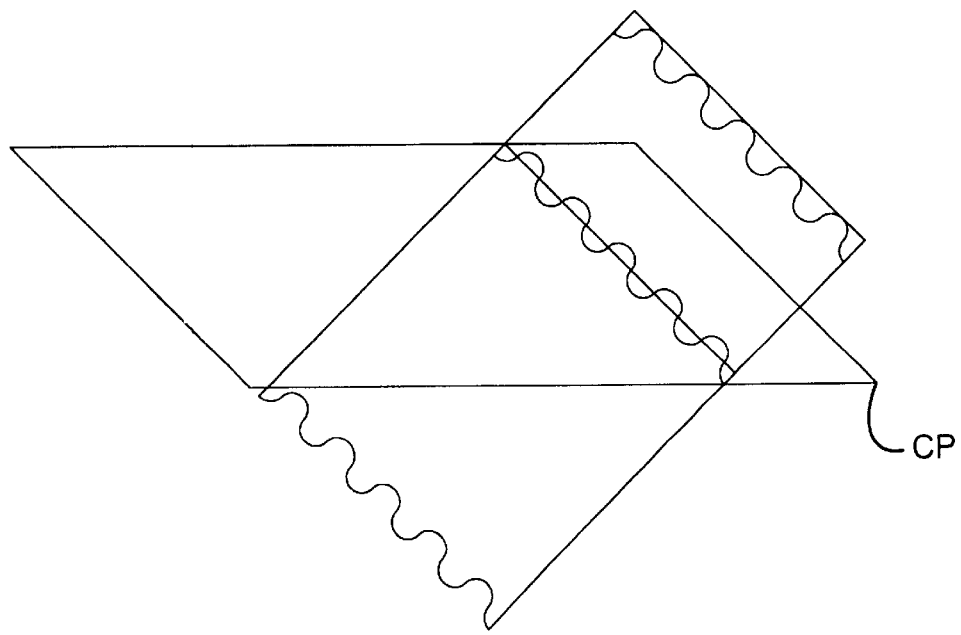

FIG. 15B shows one example of an edge modulating signal. The signal comprises a sine wave in the line direction and which repeats on every line of a frame. FIG. 15C shows a sine wave which is in the frame direction and which repeats in the line direction. FIG. 15D shows a sine wave in the line direction but which is phase shifted from line to line the result being a set of waves having a wavefront WF directed at an angle θ to the line direction. FIG. 15E shows a solid, in this case a simple ramp, combined with a frame of sine waves as shown in FIG. 15C which modulates the whole ramp to effect edge modulation at the clip level CP.

Figure 12:
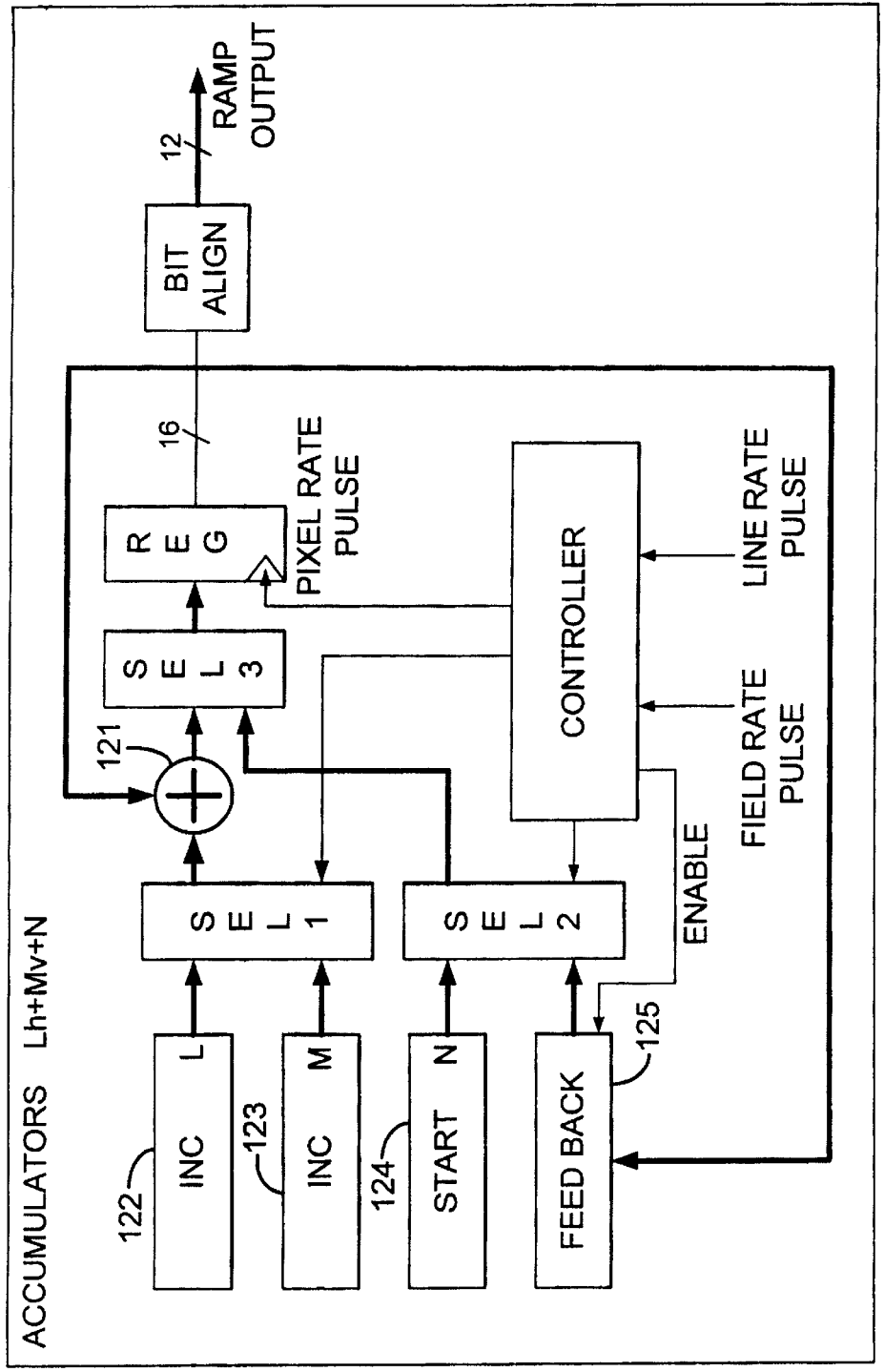
FIG. 12 is a schematic block diagram of another ramp generator for use in an edge modulator.
Figure 13:
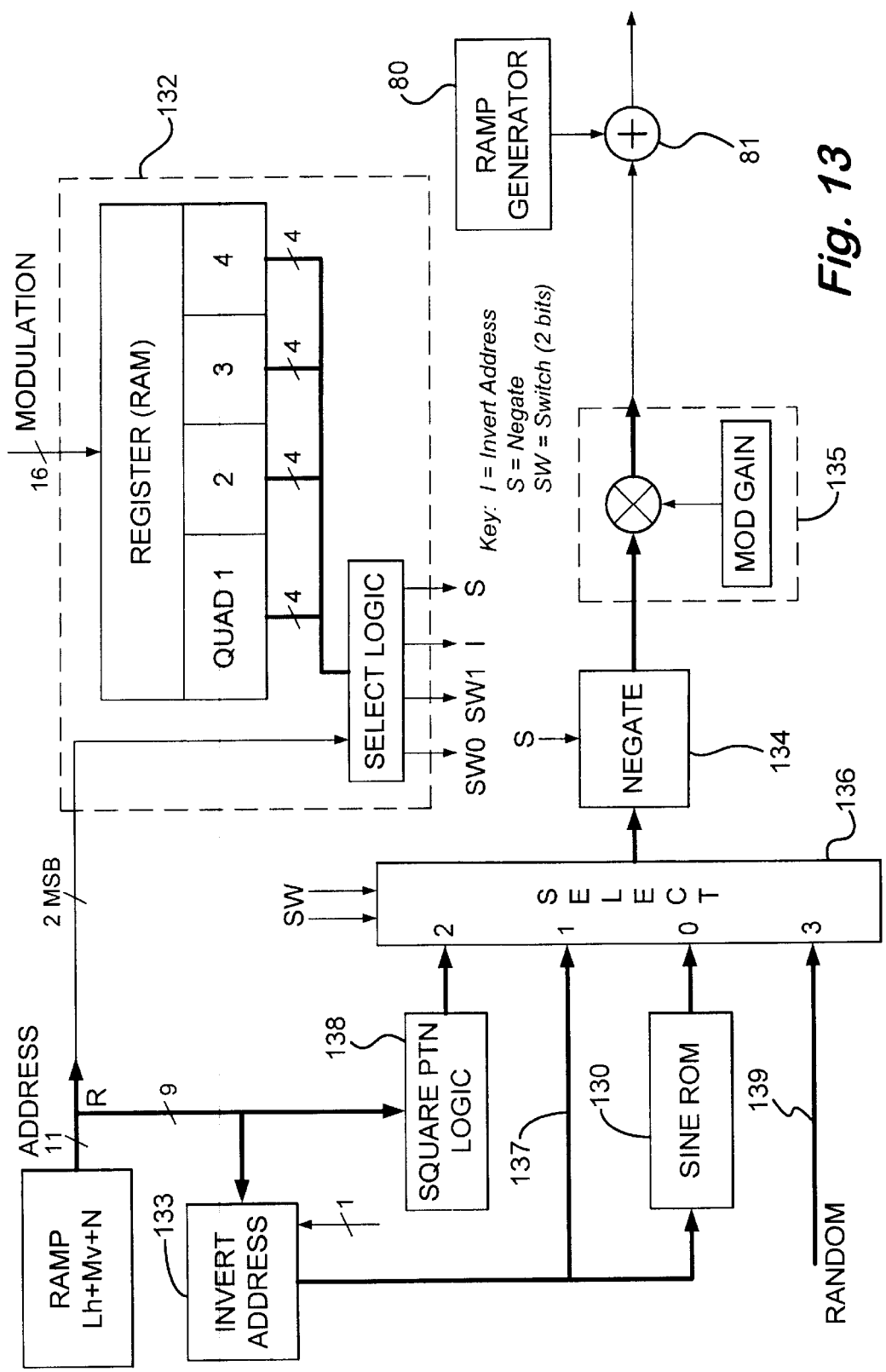
FIG. 13 is a schematic block diagram of an edge modulator.

The edge modulation function is produced by a ramp generator as shown in FIG. 12 which produces a ramp output which is transformed by the circuit of FIG. 13 to produce the desired edge modulation wave form. For ease of explanation FIGS. 12 and 13 will be described initially with reference to the production of a sine modulation signal as shown in FIG. 15A.

Referring to FIG. 12 the ramp generator comprises an output register REG which is clocked at the pixel rate by a clock signal HFCK_SYS. The output of the register REG is fedback to one input of an adder 121 which has another input coupled by a selector SEL1 to coefficient registers 122 and 123 which store coefficients L and M. The adder is coupled to the register REG via a selector SEL3. Ignoring the selectors, the register REG and the adder 121 form an accumulator which successively adds a selected coefficient to the contents of register REG. The register is not reset: once it has accumulated its maximum value e.g. all '1's it reverts to its minimum value e.g. all '0's. The register REG thus repeatedly outputs a sequence of values.

The selector SEL3 allows the register REG to be preloaded with a value N in a register 124 or the value in a feedback register 125 selected by a selector SEL2. The value stored in register REG is incremented by a coefficient L or M selected by the selector SEL1.

The generator operates as follows to produce a ramp signal according to the equation $$R = Lh + Mv + N$$

where h is pixel position along a line, and v is line number, the numbers h and v are ordinal; h=0 to n and v=0 to m.

At h=0 on line v=0, the selectors SEL2 and 3 select the coefficient N from register 124 and preload register REG with N. The register REG outputs N which is feedback to the adder 121 and to the enabled fedback register 125 where it is stored. On pixel h=1 the value N is incremented by value L selected from register 122 by selector SEL1, so that register REG contains N+L which is output and fedback to the adder 121, but not to the feedback register 125 which is disabled. The register REG and the adder then accumulate N+hL. Once the register REG contains its maximum value N+hL for the first time it rolls over and repeats the accumulation of hL from zero. The accumulation of hL continues until the end of line v=0. The frequency of repetition of the accumulation of hL depends on the value of L. The start phase of the accumulation depends on N.

At the end of line v=0, the selectors SEL2 and 3 select N and preload register REG again with N which is fedback to the adder 121. If desired, selector SEL1 selects M which is added to N in the adder and stored in the register REG and output and fedback to the adder 121 and also to the now enabled feedback register 125 where N+M is stored. The selector SEL1 now selects L and N+M+hL is accumulated until the register REG reaches its maximum value for the first time on line v=1. The register then rolls over to zero and hL is repeatedly accumulated along line v=1 as before. At the end of line v=1, the selector SEL2 selects N+M from the now enabled feedback register 125 and the register REG is preloaded with N+M via selector SEL3. N+M is output and fedback to the adder. Selector SEL1 selects M from register 123 and adder produces N+2M which is stored in register REG and output and feedback to the adder and to the now enabled feedback register 125 where it is stored. Thereafter N+2M +hL is accumulated as on the preceding lines. The process repeats on successive lines with the preload value in register REG incremented by M on each line. The effect of M is to shift the phase of the accumulation on each line by an amount dependent on M.

The ramp values R output by the register REG are used to address a look-up table in a ROM 130 of FIG. 13 to produce a sine modulation. Although the ROM could be arranged to store a whole sine cycle in this embodiment it stores only one quadrant of a sine wave to minimise the data stored. In this example the value R is an 11 bit twos complement number. The 9 less significant bits are used to address the ROM. The two most significant bits are used to indicate which quadrant is to be produced. Referring to FIG. 15A, four quadrants of a sine function are shown at a to d. Assuming MSBs 00 select quadrant a then quadrant b (01) is produced by inverting the 9 bit address in inverter 133. Quadrant c (10) is produced by negating the sine function data in negater 134 and quadrant d (11) is produced by both inverting the address and negating the sine-function data.

Referring again to FIG. 13, the two MSBs of the 11 bit ramp signal R are fed to logic 132 to indicate which quadrant to produce. Logic 132 then produces a invert (negate) enable signal S, a 1-bit address invert enable signal I, and a 2-bit switch control signal for controlling a selector 136 according to the indicated quadrant. The 9 LSBs of the ramp signal R are fed to the ROM 130 via an address inverter 133 which either inverts the address or does not invert it according to the invert enable signal I from logic 132. The address from the inverter addresses the ROM 130 to produce the desired quadrant. The ROM output data is fed to the negater 134 which negates the sign or not according to the sign negate enable signals from the logic 132. The negater 134 is followed by a gain adjuster 135 which controls the amplitude of the modulation. The modulation is then added to the solid produced by ramp generator 80 in the adder 81 of FIG. 8 for example.

Referring to FIG. 15B, an example of a sine modulation is shown. This example is produced when N=0, and M=0. The frequency of the modulation is dependent on L. The sine repeats on each line with any phase shift relative to the beginning of each line as provided by N or relative to each preceding line as provided by M. FIG. 15C is an example for N=0 and L=0. The sine modulation is in the frame direction. FIG. 15D is an example for N=0 and L and M have non-zero values. The sine modulation is directed at an angle which is dependent on L and M. M produces an accumulative phase shift from line to line.

When the modulation of FIG. 15C is added to a solid, in this example a simple ramp, the result is as shown in FIG. 15E. The clip level intersects the modulated ramp along a line CL which is the projection of the modulation onto the clip level plane. The modulation applies to only one edge. If several edges of a solid are to be modulated, each ramp forming the solid requires to be separately edge modulated before the ramps are combined.

Referring to FIGS. 13 and 14, edge modulation patterns other than sine functions may be produced. As shown in FIGS. 14e to h, a triangular modulation may be produced simply by applying inversion and/or negation to the otherwise unmodified ramp signal R. As shown in FIGS. 14i to l, a square wave may be produced by selectively negating and/or inverting the two MSBs of the ramp signal.

Referring to FIG. 13, these other modulation patterns are produced under the control of logic 132. The logic 132 decodes the quadrant selection to produce a 4 bit number representing decimal 0 to 15 as shown in FIG. 14 to choose the combination of negation, inversion and pattern type. The pattern selection signals are applied to a selector 136 to select the sine ROM 130, the ramp itself at input 137, or the square wave pattern produced by logic 138 from the two MSBs of the ramp signal. The edge modulator of FIG. 13 also has an input 139 for receiving pseudo-random numbers. The selector is controllable to select the input 139. The effect is an edge modulated by random 'noise'. The logic 132 may comprise a 16-bit register operating as a 4 by 4-bit look-up table. The register is programmable via a 16-bit input, to define various edge-modulation patterns.

Solid Modulation

FIG. 16 illustrates, in simplified form, one example of solid modulation. In this example a box solid 161, (formed by combining absoluted ramps as described above) is combined with the additive sum of two sinusoidal waveforms 162, 163 at right angles to each other. In the clip plane, the result will be approximately as shown at 164.

It will be appreciated that solid modulation differs from edge modulation in that it occurs after a plurality of ramps have been combined, and/or it uses a combination of two modulating waveforms.

Thus, solid modulation is modulating an entire solid (in contrast to just an edge) with a modulation waveform, which modulation waveform most preferably is itself a combination of two different waveforms.

In the example of FIG. 17, the solid modulation is generated by combining two waveforms generated by generators 170 and 171 as described with reference to FIGS. 13 and 14. The waveforms are combined by a combiner 172 as described with reference to FIGS. 10 and 11. The two waveforms which are combined may be any two of the types produceable by a generator of FIG. 13. For example a sine wave may be combined with a square wave. Those types are additionally variable in accordance with the values of the coefficients L, M and N. In addition the combiner 172 provides additive and non-additive combinations. Thus a very large number of different modulations can be produced.

Although FIG. 17 combines only two waveforms, more than two could be combined. The solid modulator may be additional to the edge modulator or may be provided instead of the edge modulator. Solid modulation may be applied to a solid which has no edge modulation or to a solid which has edge modulation.

Pairing

Figure 18:
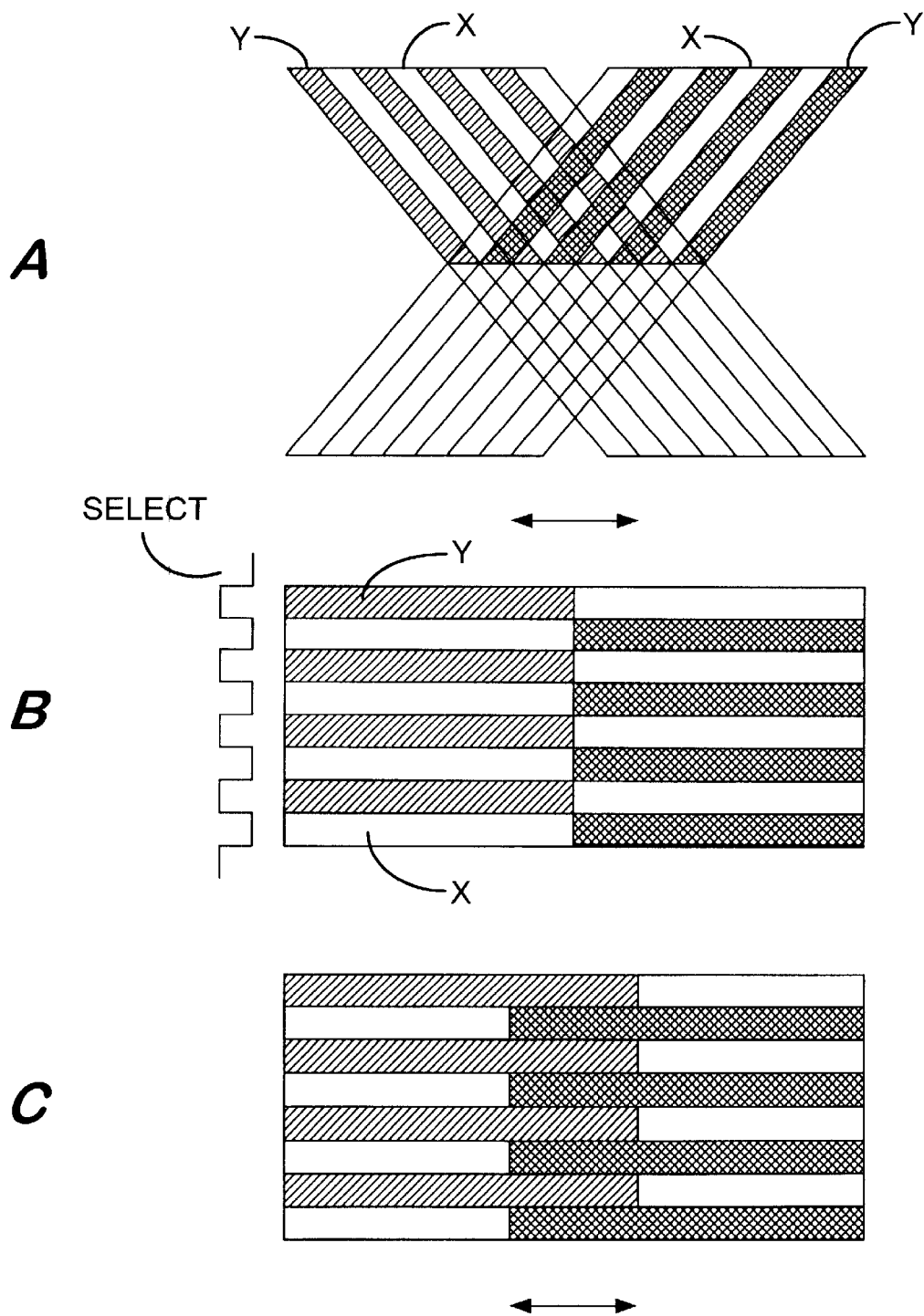
FIG. 18 comprises schematic diagrams explaining pairing.

Referring by way of example to FIGS. 18A to C two solids, in this case simple ramps as shown in FIG. 18A, are each in the form of spaced 'slats'. The hatched slats represent one video source Y which replaces another X which is represented by the blank slats. The slats of one solid are complementary to the slats of the other as shown in FIG. 18B. Such slatted solids are termed "paired solids". The two solids can be merged as shown in FIG. 18C or alternatively, as the clip level moves down, increasingly the complementary slats merge into one another. The simple ramps of FIG. 18 are only an example and complex solids can be formed by combining slatted ramps.

Figure 19:
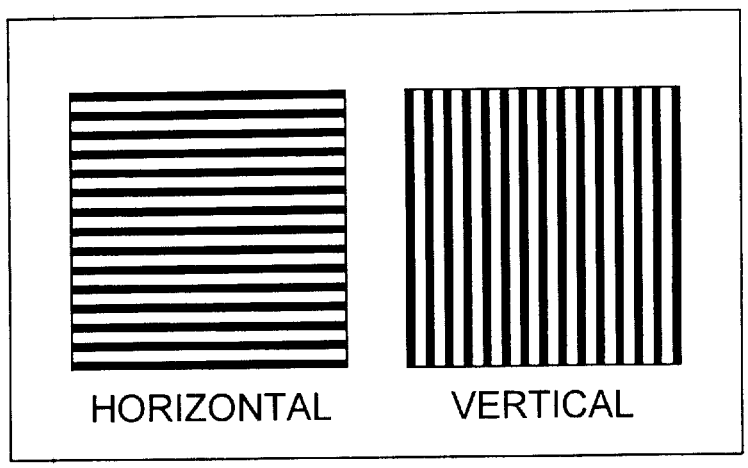
FIG. 19 shows vertical and horizontal slats.

Referring to FIG. 18A, a pair of ramps are produced. In the example of FIG. 18A, one ramp is the inverse of the other but in general the ramps may be unrelated. Spaced slats are selected from one ramp and intervening slats are selected from the other by a selection waveform as shown at the left hand side of FIG. 18B. The slats of FIG. 18 are horizontal. The slats may be vertical or horizontal as shown in FIG. 19.

Figure 20:
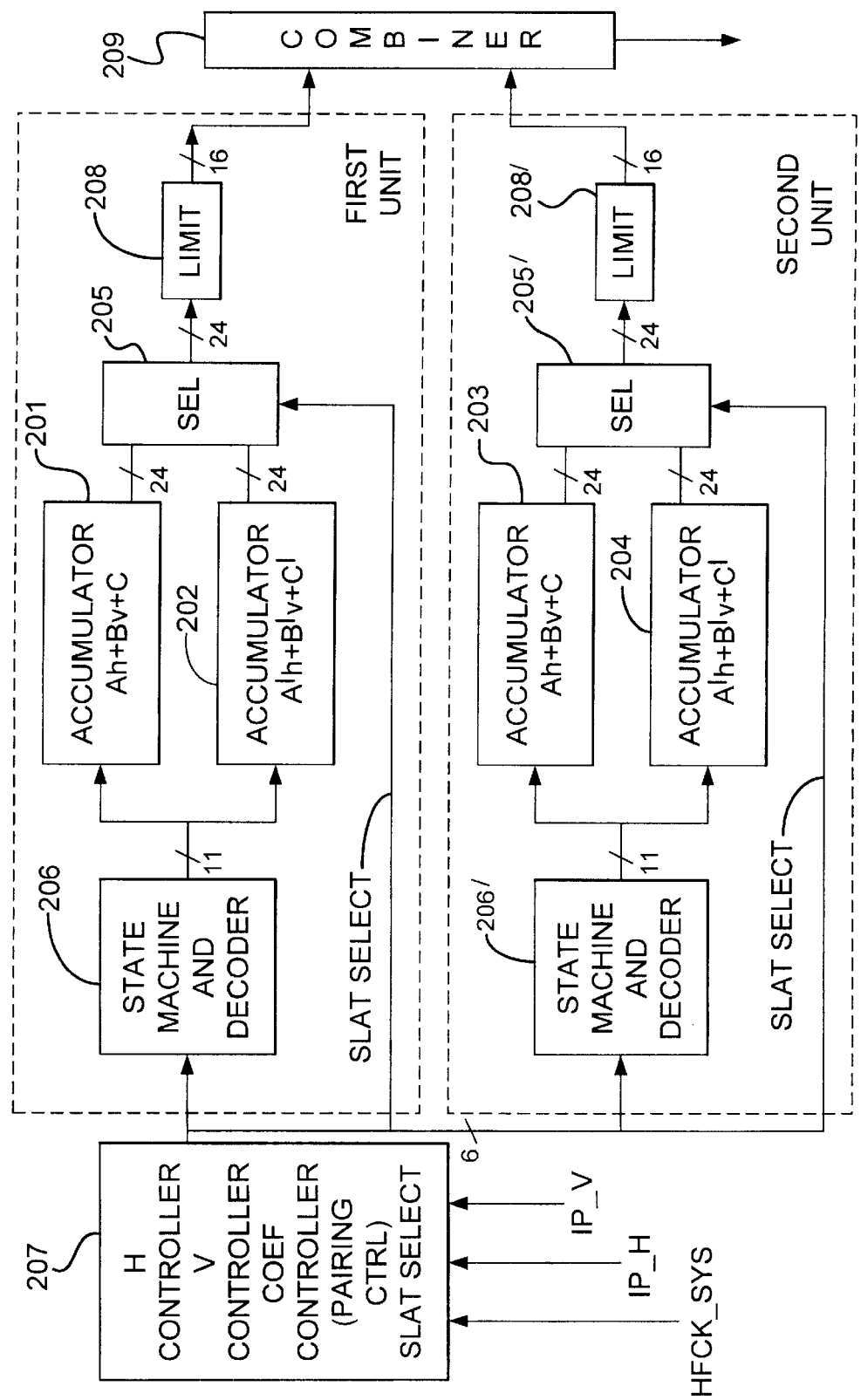
FIG. 20 is a schematic block diagram of a pairing generator.

Referring to FIG. 20, a schematic block diagram of circuit for producing paired ramps is shown. The circuit comprises first and second ramp generations units. The first unit comprises a first and second ramp generators 201 and 202. The second unit also comprises first and second ramp generators 203 and 204. Each ramp generator 201 to 204 is, for example, as shown in and described with reference to FIG. 5. The first unit is the same as the second unit and only the first unit will be described in detail. The first unit comprises a selector 205 which is controlled by the slat selection waveform to select the outputs of the first and second ramp generators 201 and 202 alternately. The ramp generators 201 and 202 may produce ramps as shown in for example FIG. 18A in which one is the inverse of the other but more generally may produce independent ramps. Usually the ramps are related in some way. For example one may be the inverse or reflection of the other. In general the ramps need not be related. The ramps produced by the generators are defined by the coefficients A, B and C fed to them by a state machine and decoder 206 which is controlled by a controller 207. The ramps may be limited by a limiter 208.

Figure 21:
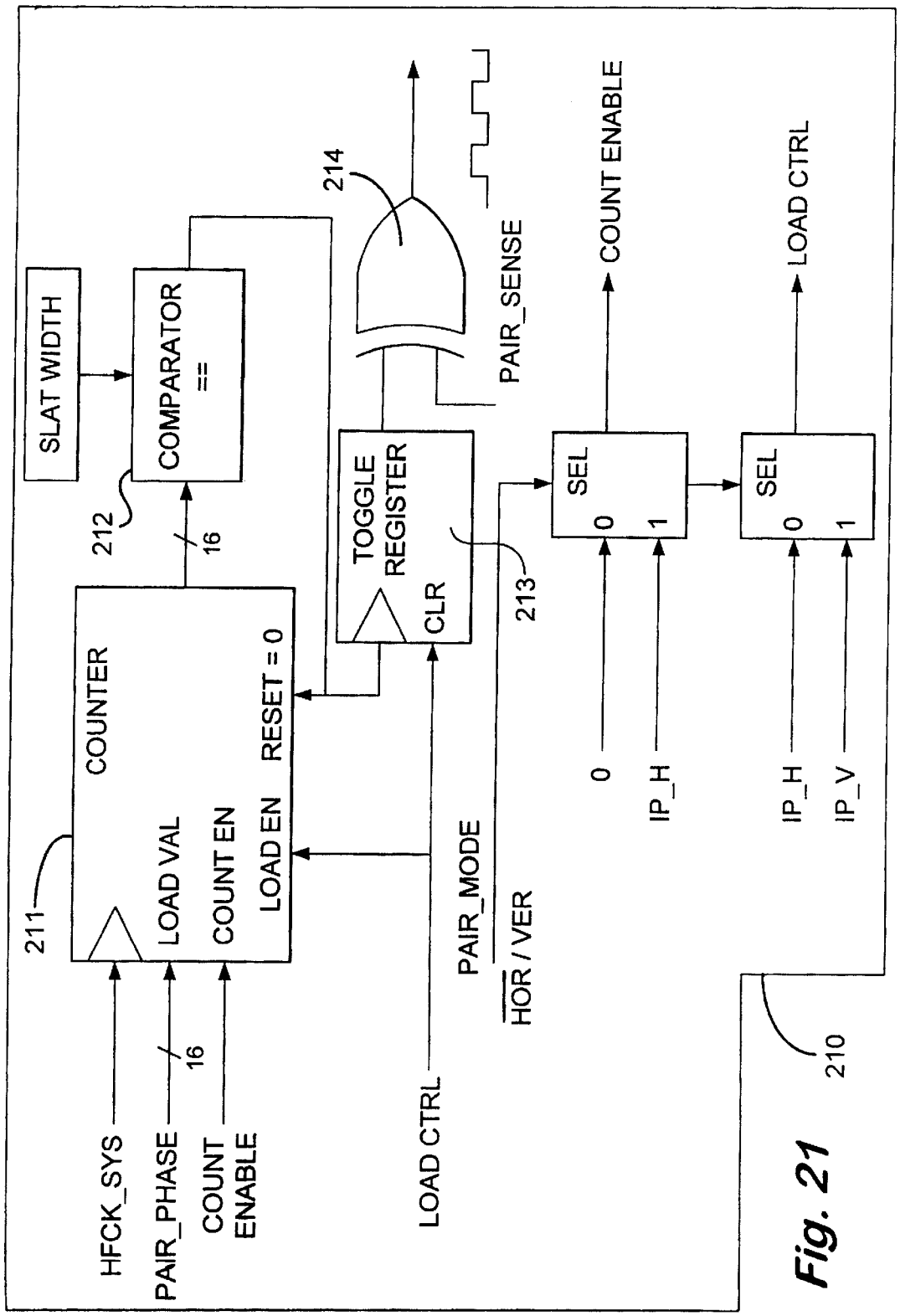
FIG. 21 is a schematic block diagram of a control signal generator of the pairing generator of FIG. 20.

The slat selection signal is produced by a generator 210 shown in FIG. 21 and which is part of the controller 207. The generator 210 produces a square wave which defines the width of the slats and the position of the slats in the frame. The square wave may select horizontal or vertical slats. For each of explanation, production of vertical slats will be discussed. The square wave is produced by a counter 211 which counts the HFCK_SYS pulses which occur at the pixel rate. The output count of the counter 211 is compared in a comparator 212 with a count representing a reference width set by the controller 207. When the counts are equal the counter is reset to zero. At the occurrence of each reset, the state '0' or '1' of a bistable 213 (toggle register) is inverted to produce the square wave. The start phase of the count may be set by preloading the counter with a count PAIR_PHASE when a load enable pulse loadEn is provided. This enables the first edge of the first slat to be positioned with respect to the beginning of the line. The state of the bistable 213 is reset to a predetermined state each time the load enable signal is produced to ensure that the sense of the square wave is known at the beginning of every line. The sense of the square wave may be inverted by a PAIR_SENSE signal combined with the square wave in an EX-OR gate 214.

In order to produce horizontal slats, the counter counts the line pulses IP_H. Otherwise the operation is the same. The start-phase of the slats is set by the preloaded count PAIR_PHASE. Thus can be used to allow the slats to be centralised with different video standards such as 625/50 and 525/60.

By providing at least two units which are all subject to the same slat selection signals, a first complex solid can be produced by combining the first ramps produced by the units and a second complex solid can be produced by combining the second ramps produced by the units. The ramps may be combined using ramp combiners 209 as shown in FIGS. 9, 10 and 11. A solid produced by a ramp combiner from the first ramps is thus paired with another solid produced by another ramp combiner from the second ramps.

Mask Generator

Figure 22:
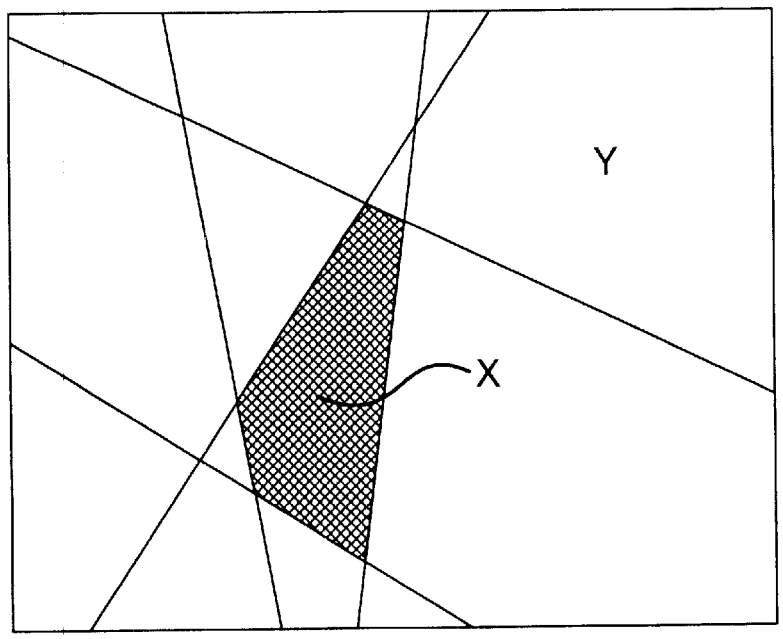
FIG. 22 is a diagram illustrating the use of the generator of FIG. 23.

Referring to FIG. 22, in accordance with this embodiment of the invention, it is desired to mask an arbitrary area X within a frame, the area X being surrounded by area Y. A plurality of ramps are combined by Non-Additive Mixing (NAM) to produce an arbitrary shape for the mask area X. All internal angles of intersections of lines defining the boundary are less than 180°.

The area X may contain an image feature which should not be visible in the final image. For example the area X may contain the image of a microphone or some other piece of production apparatus. The video in area X may be replaced by video from another source to hide the undesired image feature. Alternatively, the arbitrary masking may be used to produce wipe patterns which are not otherwise provided.

Figure 23:
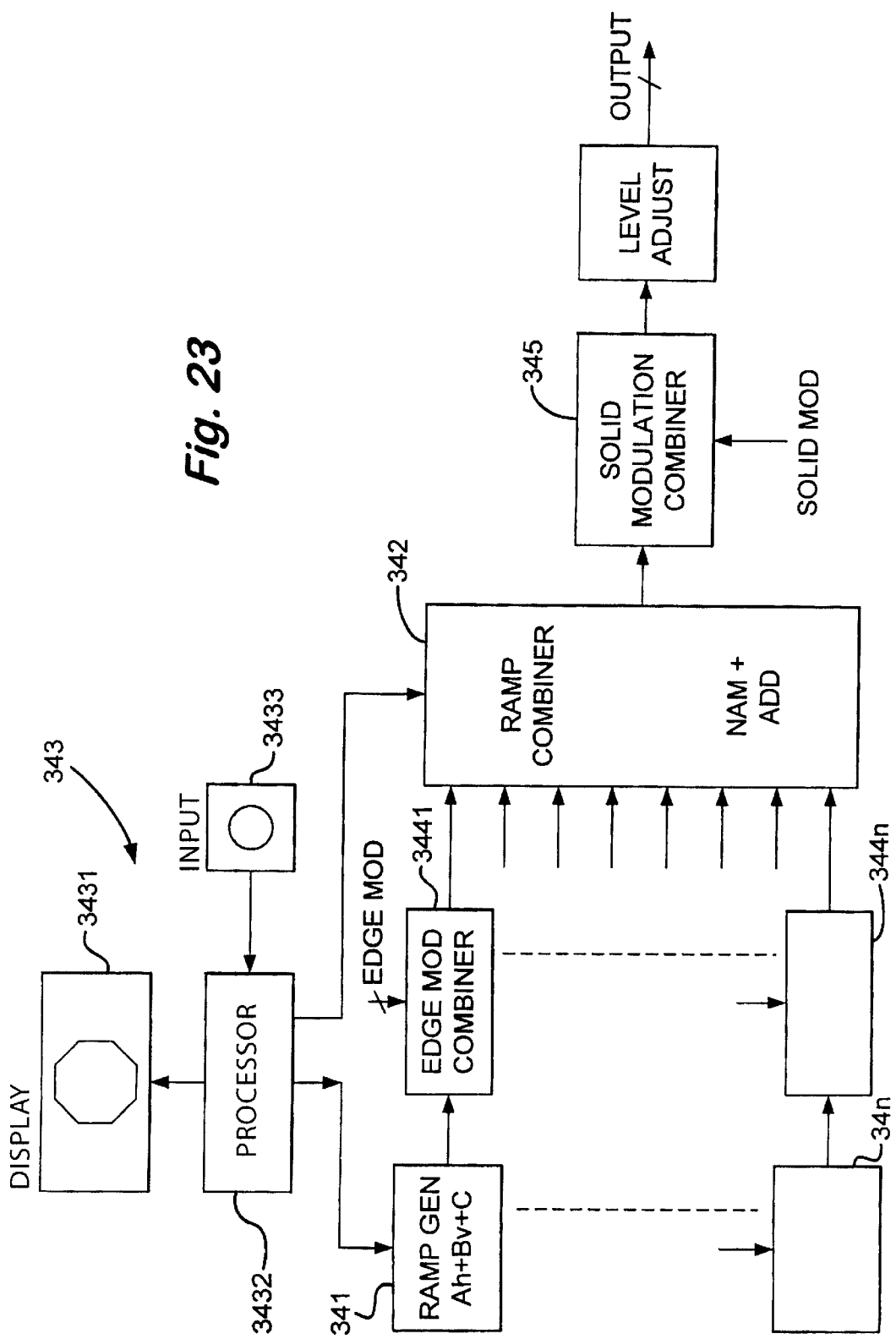
FIG. 23 is a schematic block diagram of a mask generator according to an embodiment of the invention.
Figure 24:
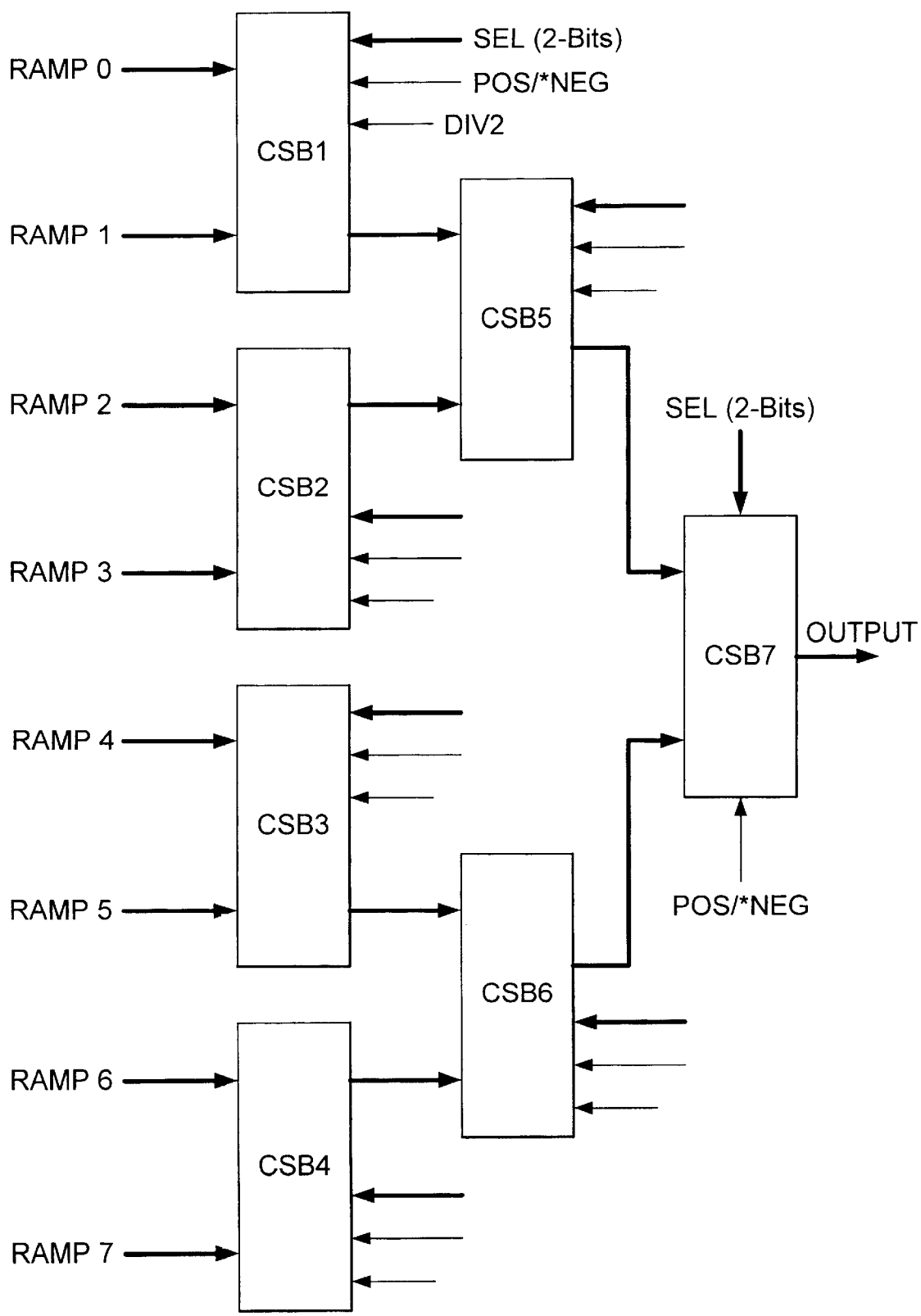
FIG. 24 is a schematic block diagram of a combiner of the generator of FIG. 23.

Referring to FIG. 23, a mask generator comprises a plurality of ramp generators 341 to 34n connected to a ramp combiner 342. In this example there are 8 ramp generators but there may be fewer or more. Each ramp generator is as shown in and described with reference to FIG. 5. The ramp generators are controlled by a controller 343 to produce ramps which define the mask area X. The ramp combiner is shown in FIG. 24. The combiner is also controlled by the controller 343. It comprises a plurality of combining stages CSB1 to CSB7. Each combining stage is as shown in and described with reference to FIGS. 10 and 11. Referring to FIG. 10, two ramps A and B may be combined by NAM 99, added 97, or simply one or the other may be selected by the selector 96 and delivered to the output unmodified. By control of the selector 96 the pairs of ramps delivered to the stages CSB may be selected and combined in desired combinations. The ramps which are selected in the combiner 342 are Non-Additively Mixed to produce the desired mask area X.

As discussed herein above, the ramps are defined by $$R=Ah+Bv+C.$$

The coefficients A, B, and C define the slope, orientation and position of the ramp.

The controller 343 comprises a display device 3431, a processor 3432 such as a computer, and an input device 3433. In this example, the input device 3433 comprises a pointing device such as a mouse, track ball or tablet, and may include, additionally or alternatively, a keyboard.

The controller 343 is set up to define preset regular polygons of 3 to 8 sides assuming there are eight ramp generators. More generally, if there are n ramp generators the controller is set up to define polygons of 3 to n sides. The operator chooses a preset polygon with a chosen number of sides using the input device 3433.

The vertices of the polygon are individually selectable. In this example, the operator chooses a vertex and, using a pointing device, drags it to a desired position. The operator repeats that for as many vertices as necessary to produce the desired shape for the marks area X. Such operations are well known in graphics programs.

The ramps produced by the ramp generators 341 to 34n can be made to have identical slope and a fixed clip level is defined. The processor 3432 calculates, from the co-ordinates of the vertices of the desired mask area X, the coefficients A, B and C of each ramp to produce ramps which intersect the clip plane with the desired co-ordinates.

If less than eight ramps are required, the combiner is controlled by the processor to select, using the control signals SEL2, the ramps which produce the desired mask area. The selection is predefined with the predefined polygons.

Each ramp may be edge modulated by an edge modulator 3441, 3442, . . . 344n, which is as described with reference to FIGS. 12 to 15.

The solid produced by the combiner 342 may be solid modulated by a solid modulator 345 as described with reference to FIGS. 16 and 17.

Clock Wipe

Figure 25:
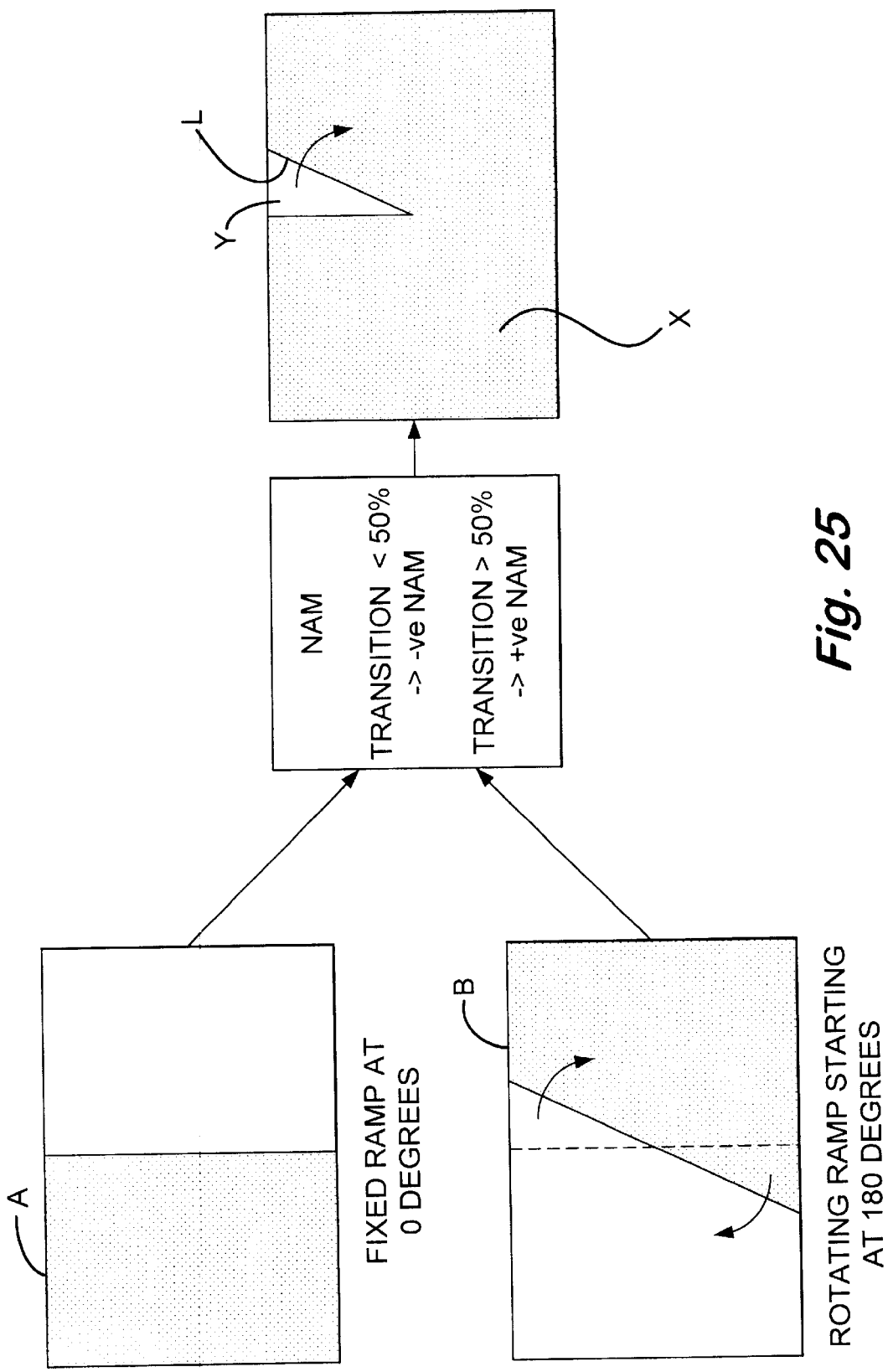
FIG. 25 is a diagram illustrating the use of a rotary wipe generator of FIG. 26.

Referring to FIG. 25, it is desired to produce a wipe pattern which rotates, hence the term 'clock wipe'. A variety of patterns can be produced, some of which will be described herein. All the patterns use two or more ramps which have the same slope. The ramps bisect at a fixed clip level.

Firstly, for ease of explanation, a simple clock wipe using one fixed ramp A and one rotating ramp B will be described. In FIG. 25, two ramps A and B are provided with the same magnitude of slope but one ramp A slopes in the opposite direction to the other B. One A of the ramps is fixed, whilst the other B rotates. The effect is that a frame of video X shown black in FIG. 25 is replaced by a segment of video Y which continually increases as its leading edge L rotates. To produce this effect, the ramps A and B are Non-Additively Mixed. This is described in more detail with reference to FIGS. 25 and 26A to D. As discussed above, a NAM has the following truth table:

| Comparison Of Ramps | POS/NEG | Output Of NAM |
| --- | --- | --- |
| A > B | POS | A |
| B > A | POS | B |
| A > B | NEG | B |
| B > A | NEG | A |

For POS/NEG POS, the NAM outputs whichever of A and B is greater at any moment in time, i.e. at any pixel position. For POS/NEG NEG the NAM outputs whichever of A and B is smaller.

Referring to FIG. 26A, two oppositely sloping ramps A and B are shown. The ramps bisect at a fixed clip level. The ramps, when non-additively mixed, form a solid. Where the solid level is greater than the clip level CL, video Y is selected; where the solid level is less than the clip level CL, video X is selected. FIG. 26B shows a frame in which the two ramps are parallel with the edges of the frame and combined by the NAM in a negative combination NEG. Thus the solid is formed by the portions of the ramps below the clip level and the whole frame comprises video X. FIG. 26D shows the ramps combined in a positive combination POS so the portions of the ramps above the clip level are selected and the whole frame comprises video Y. Assuming the ramp B is rotated clockwise from the starting position of FIG. 26B, if the NAM is negative whilst the leading edge L is in the right hand half of the frame, then the segment of video Y is selected. The ramp B rotates until it is parallel with ramp A. The NAM then becomes positive. The segment of video Y then continues to replace X in the left hand half of the frame.

Figure 27:
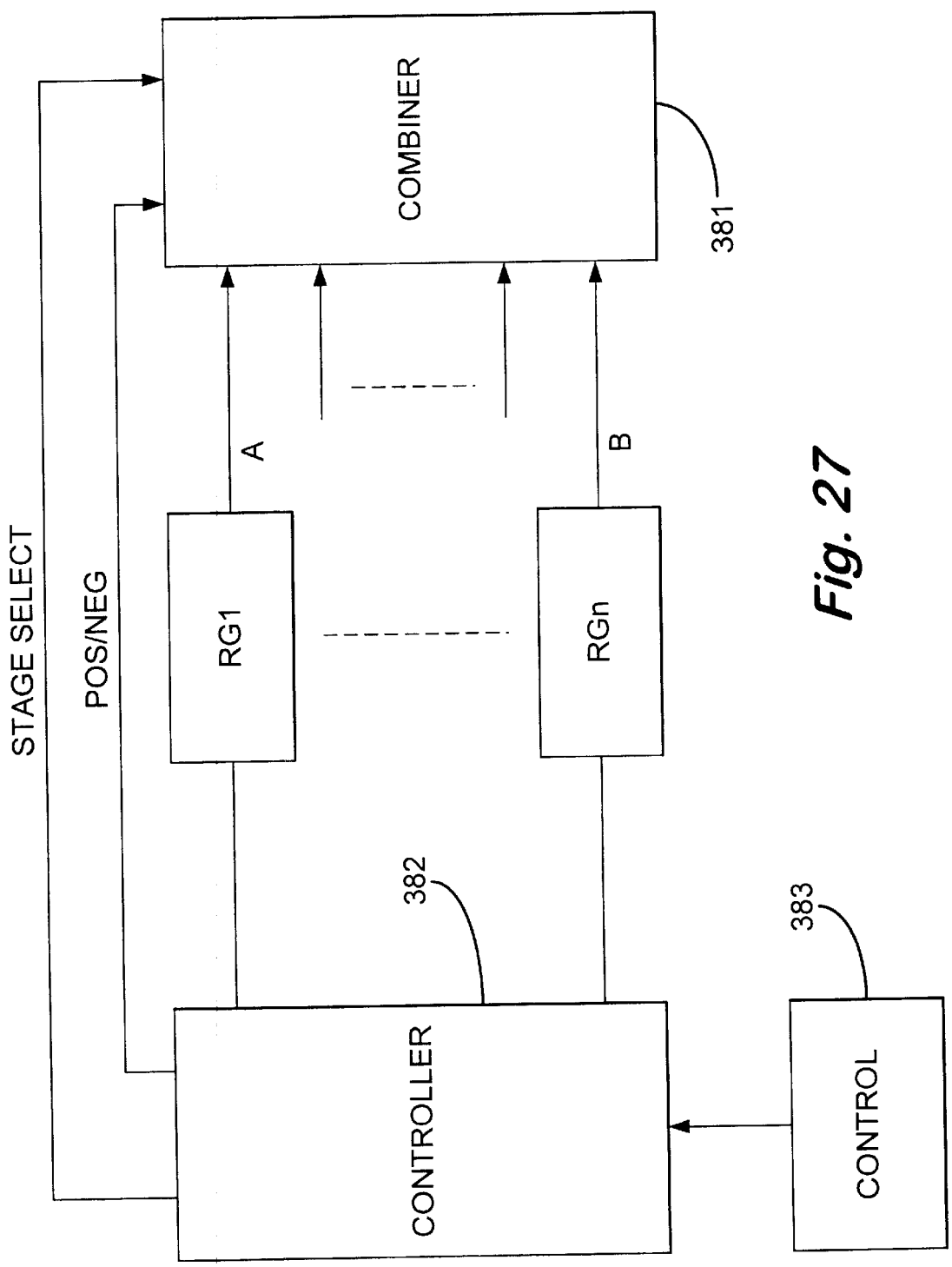
FIG. 27 is a schematic block diagram of a rotary wipe generator.

FIG. 27 is a schematic block diagram of a wipe generator for producing such a wipe pattern. The wipe generator of FIG. 27 may be, and preferably is, implemented using the wipe generator of FIG. 23. It comprises a plurality of ramp generators RG1 to RGn, where n is preferably 8, each as described with reference to FIG. 5 or FIG. 39, and a combiner 381 as described with reference to FIGS. 24, 10 and 11. A controller 382 defines many preset clock wipe patterns.

The patterns are defined by: the coefficients A, B and C of each ramp; the selection of ramps by the select signals SE2 applied to the combiner; and the control of the POS/NEG signals applied to the NAMs in the combiner. The rotation of a pattern is controlled by a rotation control 383 which may be a linear potentiometer.

Figure 26:
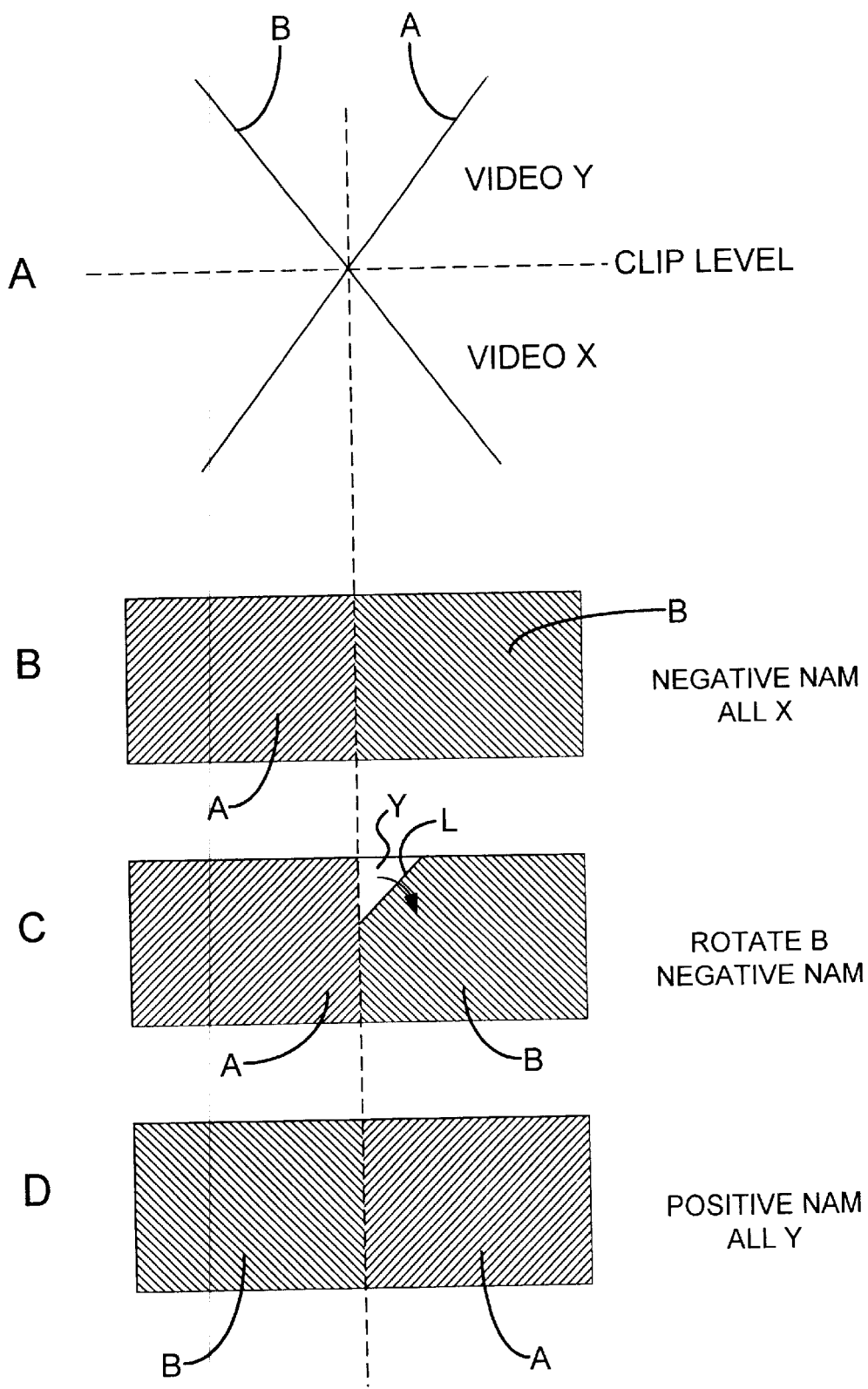
FIG. 26 is a diagram illustrating the aspects of a rotary wipe.

For the wipe pattern of FIGS. 25 and 26, two ramp generators are selected to produce the ramps A and B. The controller 382 generates the fixed coefficients of ramp A and controls the combiner 381 to route the ramps A and B through the combiner to be combined in a NAM.

The controller 382 produces POS/NEG control signals to control the individual NAM signals to be positive or negative NAM stages. The controller 382 produces stage selector signals to cause a selected stage to act as a NAM stage or to simply route signals unchanged. The controller 382 may produce at least the stage select signals in dependence upon position of the wipe in a frame: however that is not preferred currently.

Ramp B has varying coefficients A and B. Coefficient C may be varied. The rotation control 383 controls the rotation of the wipe. The position of the rotation control directly represents wipe angle. The relationship between the position of the rotation control and the rotation angle is dependent on the pattern and is preset by the controller 382. The controller calculates the coefficients A and B and C of the ramp B which place the ramp at the desired angle. A wipe angle of 180° also indicates the point in the wipe at which the NAM function changes from Negative to Positive.

FIGS. 28A to E show some, out of may possible examples, of preset rotary wipe patterns, together with the configurations of the combiner of FIG. 35 needed to implement the patterns, and the ramps at the starting points of the wipes. In the FIGS. F denotes a fixed ramp and R denotes a rotating ramp, and CL denotes the fixed clip level.

Figure 28A:
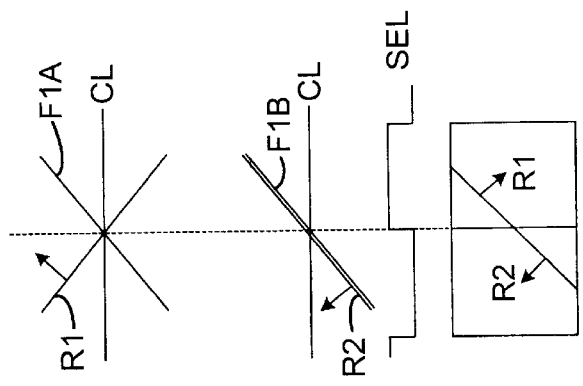
FIGS. 28 A to E illustrates some examples of rotary wipe patterns.

In FIG. 28A two oppositely rotating ramps R1 and R2 wipe two halves of the frame from top to bottom.

The controller 382 selects combining stages CSB1, 2 and 5 and sets them to act as NAM stages, and also selects CSB7 (not shown) to simply route the output of CSB5.

CSB1 and 2 are set as negative NAM stages and CSB 5 is set as a positive NAM stage.

CSB1 receives at its inputs the fixed and rotating ramps F1 and R1 having the starting position shown. CSB2 receives at its inputs the fixed and rotating ramps F2 and R2 having the starting positions shown.

Figure 28C:
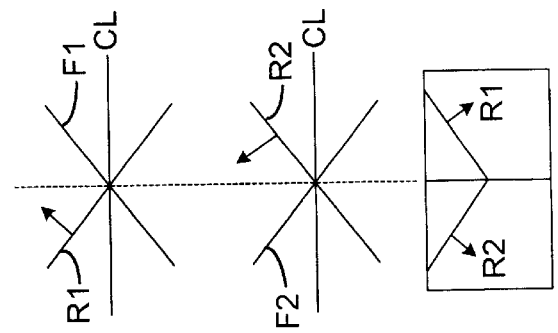
Figure 28B:
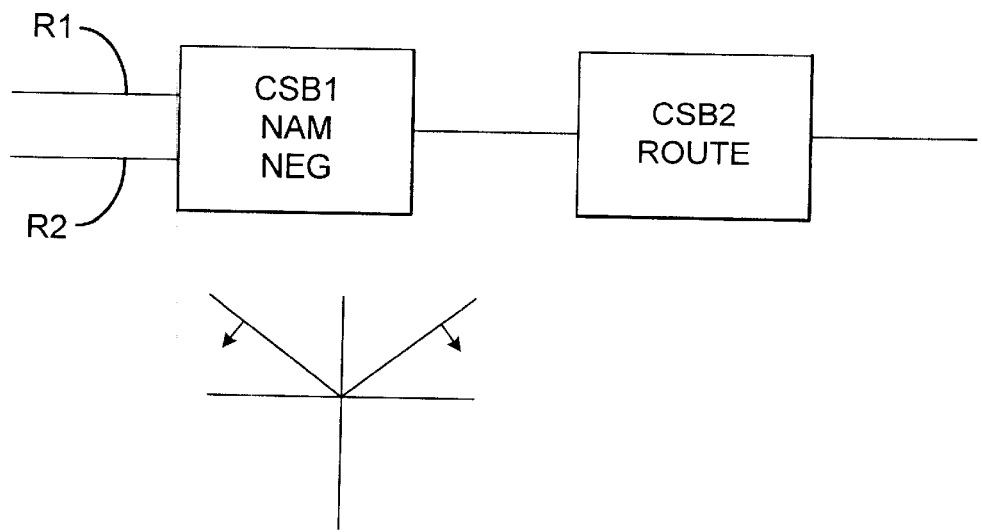

An alternative way of generating the pattern of FIG. 28A is to use two ramps R1 and R2 and rotate R1 oppositely to R2 and negatively NAM them, as shown in FIG. 28B.

Referring to FIG. 28C, a wipe pattern comprises two radially opposite lines rotating in the same sense (clockwise in FIG. 28C). The controller 382 configures the combiner 381 to comprise stages CSB1, 2, 5 and 7. Stage CSB1 is set as a negative NAM, and stage CSB2 is set as a positive NAM. Stage CSB5 selects the output of CSB2 in the left half of the frame and CSB1 in the right half of the frame.

CSB7 (not shown) simply routes the output of stage CSB5.

Stage CSB1, which generates the wipe pattern of the right half of the frame, receives fixed ramp F1A and rotating ramp R1 having the shown starting positions from respective generators RG1, RG2 for example. Stage CSB2, which generates the wipe pattern of the left half of the frame, receives fixed ramp FIB and rotating ramp R2 from respective generators RG3 and RG4 for example. The ramps R2 and FIB have the starting positions shown.

Figure 28D:
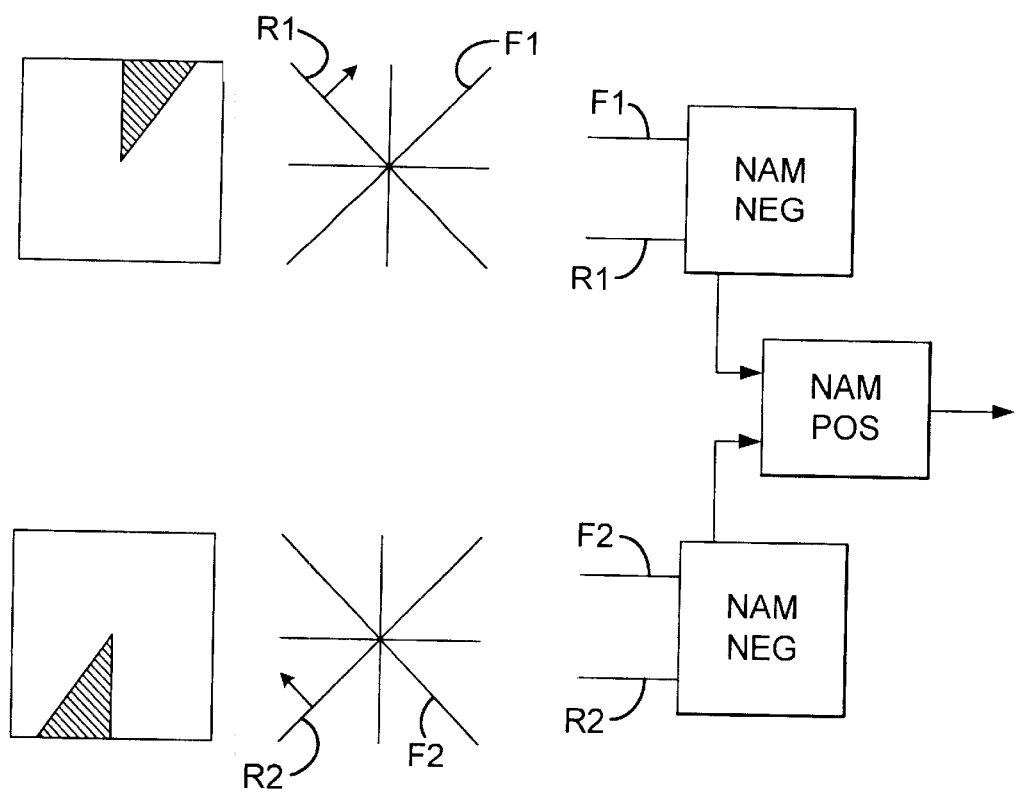

The controller produces a selection signal SEL which is applied to the stage CSB5 which acts as a selector. On each line, the selector CSB5 selects the output of CSB2 in the left half of the frame, and the output of CSB1 in the right half of the frame. The selector signal selects horizontally. Other patterns can be created by selecting upper and lower halves of the frame, using a vertical selection signal. It is possible to select quadrants of a frame using both horizontal and vertical. However, selection of halves or quadrants of a frame is not preferred. FIG. 28D illustrates a preferred alternative to FIG. 28C which avoids selecting quadrants. Instead of selecting quadrants, the rotating ramps are generated by control of the ramp coefficients A, B and C such that each ramp rotates over a particular range of rotation, the ramps having different starting positions.

Thus, referring to FIG. 28D, to generate a wipe comprising two radially opposite lines rotating in the same sense, two negative NAM stages receive a fixed ramp F1, F2 respectively and rotating ramps R1, R2 respectively where $R2(\theta)=R1(\theta+\pi)$ and $F2(\phi)=F1(\phi+\pi)$ where $\theta$=angle of rotation of ramp R1, and $\theta$ is the fixed position of F1. The starting positions are shown schematically in FIG. 28D. A positive NAM stage NAMs the output of the two negative NAM stages to produce the wipe pattern.

Figure 28E:
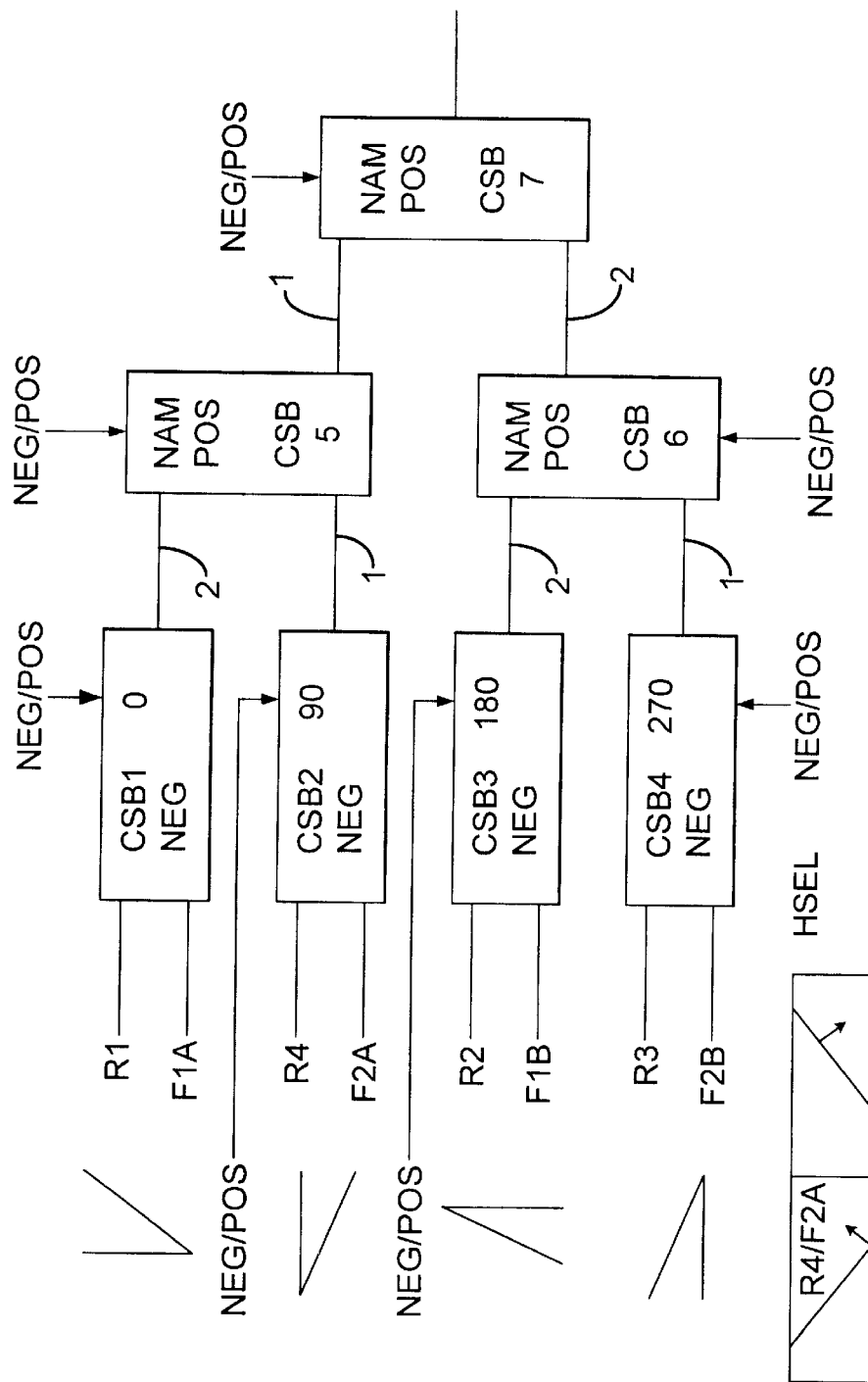

FIG. 28E illustrate a wipe pattern having four rotating ramps R1 to R4 each of which wipes a quadrant of the frame. The controller 382 configures all of the stages CSB 1 to 7 of the combiner 381. Stages CSB 1 and 3 are set as negative NAM stages and stages CSB 2 and 4 are set as positive NAM stages. Stages CSB5 and 6 are horizontal selectors and stage CSB7 is a vertical selector, as will be explained.

Stage CSB1 receives a rotating ramp R1 and a fixed ramp F1A which are the same as ramps R1 and F1 of FIGS. 28A and B. Stage CSB3 receives a rotating ramp R2 which his the same as R1 but rotated 90° and ramp F1B which is the same as ramp F1A.

Stage CSB4 receives a rotating ramp R3 and fixed ramp R2B which are the same as ramps R2 and F1B of FIG. 28B. Stage CSB3 receives a rotating ramp R4 which is the same as R3 but rotated 90° and a fixed ramp R2A which is the same as F2B.

The ramps R1 to R4, F1A, F1B, F2A and F2B are produced by respective ramp generators.

Edge modulation may be applied to the individual ramps, and solid modulation may be applied to the combined ramps.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A signal generator comprising a first ramp generator which produces a video ramp signal R1 for each pixel of a predetermined set of pixels h where h=0 to n of each of a predetermined set of video lines v where v=0 to m, of a picture, wherein $$R1=A1h+B1v+C1$$

where A1, B1, and C1 are coefficients, a second ramp generator which produces a video ramp signal R2 for each pixel of a predetermined set of pixels h where h=0 to n of each of a predetermined set of video lines v where v=0 to m of the picture, wherein $$R2=A2h+B2v+C2$$

where A2, B2, and C2 are coefficients, means defining an angle of rotation, means for varying A2 and B2 in accordance with the change in the angle of rotation, and ramp combining means including NAM means for non-additively mixing the first and second ramps.

2. A generator according to claim 1, wherein A1 and B1 are also varied in accordance with the angle of rotation.

3. A generator according to claim 2, wherein A1 and B1 are varied so that the first ramp rotates in the opposite direction to the second ramp.

4. A generator according to claim 1, wherein the first ramp is fixed.

5. A generator according to claim 1, comprising a third ramp generator which produces a video ramp signal R3 for each pixel of the predetermined set of pixels h where h=0 to n of each of the predetermined set of video lines v where v=0 to m of the picture, wherein $$R3=A3h+B3v+C3$$

where A3, B3, and C3 are coefficients and which are varied in accordance with said angle of rotation.

6. A generator according to claim 5, wherein A3 and B3 are varied so that the third ramp rotates in the opposite direction to the second ramp.

7. A generator according to claim 5, wherein the second and third ramps have different initial preset orientations relative to the fixed first ramp, from which initial orientation rotation begins.

8. A generator according to claim 5, wherein the ramp combining means includes a plurality of NAM means for combining the first, second and third ramps.

9. A generator according to claim 8, wherein the combining means further comprises means for selecting the combined ramps produced by the NAM means.

10. A generator according to claim 9, wherein said means for selecting the combined ramps selects the ramps in dependence upon the positions of the ramps in the picture.

11. A signal generator according to claim 8, wherein each NAM means implements a positive NAM function and a negative NAM function, and comprising means for selecting the positive or negative NAM function for the NAM means.

12. A signal generator according to claim 11, wherein the NAM function is selected in accordance with the angle of rotation.

13. A signal generator comprising a plurality n of ramp generators which produces video ramp signals Rn for each pixel of a predetermined set of pixels h where h=0 to n of each of a predetermined set of video lines v where v=0 to m, of a picture, wherein $$Rn=Anh+Bnv+Cn$$

where An, Bn, and Cn are coefficients means defining an angle of rotation, means for varying at least some of the coefficients An and Bn in accordance with the change in the angle of rotation, and ramp combining means including means for non-additively mixing ramps and means for selecting ramps and/or selecting combined ramps.

14. A signal generator according to claim 13, wherein the combining means comprises a plurality of combining stages each having first and second inputs for receiving first and second ramps and an output, each stage including Non- Additive Mixing (NAM) means for mixing the ramps and selecting means for selectively coupling the output to the first and second inputs.

15. A signal generator according to claim 14, wherein each NAM means implements a positive NAM function and a negative NAM function, and comprising means for selecting the positive or negative NAM function for the NAM means.

16. A signal generator according to claim 15, wherein the NAM function is selected in accordance with the angle of rotation.

17. A generator according to claim 14, comprising means for controlling said selecting means to selectively couple the output of said selecting means to its first and second inputs in dependence upon the positions in the picture of the ramps at its first and second inputs.

18. A generator according to claim 17, comprising means for indicating the positions of the ramps in the picture.

19. A generator according to claim 13 wherein each ramp generator comprises means for storing coefficients A, B, and C and first and second accumulated values, adding means for incrementing the first accumulated value by A and the second accumulated value by B, and control means by which, for each of said lines v, the second accumulated value is incremented by the adding means by B to form $C+Bvr$ which is stored as both the first and the second accumulated values, and for each pixel of said set of pixels on each of said lines the first accumulated value is incremented by the adding means to form $$C+Bvr+Ahr$$

which is stored as the first accumulated value and is output as Rr.

20. A generator according to claim 19, wherein the storing means comprises coefficient registers for storing respective ones of A, B and C and feedback registers for storing the first and second accumulated values, and means for selectively coupling the registers to the adding means and for storing the output of the adding means in at least one of the feedback registers.

21. A generator according to claim 20, wherein the control means comprises selecting means for selectively coupling the registers to the adding means, and the output of the adding means is coupled to the feedback registers, the control means selectively enabling the registers to store the accumulated values.

22. A generator according to claim 20, wherein the coefficients are signed numbers and further comprising means for selectively inverting the sign of the coefficients before application to the adding means.

* * * * *